US010095995B2

(12) United States Patent
Green et al.

(10) Patent No.: US 10,095,995 B2
(45) Date of Patent: Oct. 9, 2018

(54) APPARATUS FOR AND METHOD OF FOREST-INVENTORY MANAGEMENT

(71) Applicant: First Resource Management Group Inc., New Liskeard (CA)

(72) Inventors: Philip E. J. Green, Mississauga (CA); Benoit St-Onge, Montreal (CA)

(73) Assignee: FIRST RESOURCE MANAGEMENT GROUP INC., New Liskeard, Ontario (CA)

( * ) Notice: Subject to any disclaimer, the term of this patent is extended or adjusted under 35 U.S.C. 154(b) by 365 days.

(21) Appl. No.: 15/037,894

(22) PCT Filed: Nov. 25, 2014

(86) PCT No.: PCT/IB2014/066331
§ 371 (c)(1),
(2) Date: May 19, 2016

(87) PCT Pub. No.: WO2015/075700
PCT Pub. Date: May 28, 2015

(65) Prior Publication Data
US 2016/0292626 A1  Oct. 6, 2016

Related U.S. Application Data

(60) Provisional application No. 61/908,436, filed on Nov. 25, 2013.

(51) Int. Cl.
*G06Q 10/08* (2012.01)
*G06Q 50/02* (2012.01)
(Continued)

(52) U.S. Cl.
CPC .......... *G06Q 10/087* (2013.01); *G06Q 50/02* (2013.01); *G06T 7/0004* (2013.01); *G06T 17/05* (2013.01);
(Continued)

(58) Field of Classification Search
CPC ...... G06Q 10/087; G06Q 50/02; G06T 17/05; G06T 7/0004; G06T 2207/10024; G06T 2207/30188; G06T 2207/30242
See application file for complete search history.

(56) References Cited

U.S. PATENT DOCUMENTS 7,212,670 B1  5/2007  Rousselle et al.
8,006,175 B2  8/2011  Kulkarni et al.
(Continued)

FOREIGN PATENT DOCUMENTS

JP  2011-24471 A  2/2011

*Primary Examiner* — Edward Park
(74) *Attorney, Agent, or Firm* — Kagan Binder, PLLC

(57) ABSTRACT

A forest-inventory management apparatus is for a forest image having forest information associated with a forest. The forest image is acquired from an in-flight vehicle. The forest-inventory management apparatus includes a server system. The server system includes a processor assembly and a non-transitory machine-readable storage medium configured to tangibly store a processor-executable programmed code. The processor-executable programmed code is configured to urge the processor assembly to execute the following operations: (A) read data representing the forest image having the forest information associated with the forest; (B) compute data representing a supply of forest inventory of hardwood and softwood trees expected to be available for harvesting based on the forest information associated with in the forest image; and (C) provide the data representing the supply of forest inventory expected to be available for harvesting from the forest associated with the forest image.

20 Claims, 21 Drawing Sheets

(51) Int. Cl.
*G06T 7/00* (2017.01)
*G06T 17/05* (2011.01)

(52) U.S. Cl.
CPC .......... *G06T 2207/10024* (2013.01); *G06T 2207/10028* (2013.01); *G06T 2207/10032* (2013.01); *G06T 2207/30188* (2013.01); *G06T 2207/30242* (2013.01)

(56) References Cited

U.S. PATENT DOCUMENTS

| | | |
|---|---|---|
| 8,194,916 B2 | 6/2012 | Ma |
| 8,300,896 B2 | 10/2012 | Kelle et al. |
| 2008/0046184 A1 | 2/2008 | Bortolot et al. |
| 2008/0234936 A1* | 9/2008 | Weinmann ............... G01C 5/00 701/494 |
| 2008/0279447 A1* | 11/2008 | Friedlander ............ G01C 11/06 382/154 |
| 2011/0055220 A1 | 3/2011 | Tyburski |
| 2012/0179433 A1* | 7/2012 | Wivell ................... G06T 17/05 703/2 |
| 2013/0211721 A1 | 8/2013 | Parisa |

* cited by examiner

APPARATUS FOR AND METHOD OF FOREST-INVENTORY MANAGEMENT

PRIORITY CLAIM

This application claims benefit from International Application No. PCT/IB2014/066331, filed Nov. 25, 2014, which in turn claims priority to U.S. Provisional Patent Application having Ser. No. 61/908,436, filed on Nov. 25, 2013, both of which are incorporated herein by reference in their entireties for all purposes.

TECHNICAL FIELD

Some aspects of the present invention are generally related to (and are not limited to) an apparatus (or system) for and method of forest-inventory management.

BACKGROUND

Forest management is a branch of forestry concerned with forest regulation including silviculture, management for aesthetics, fish, recreation, urban values, water, wilderness, wildlife, wood products, forest genetic resources, and other forest resource values. Forest management techniques include timber extraction, planting and replanting of various species, cutting roads and pathways through forests, and preventing fire. Accurate forest inventories are necessary to forest management (such as, to keep costs related to forest-inventory management tasks relatively low).

Forest management (silviculture management) is the practice of controlling, assessing and monitoring the establishment, growth, composition, health, and quality of forests to meet diverse needs and values. Silviculture also focuses on making sure that the treatment(s) of forested areas maintains their health, growth and their productivity. To some the distinction, between forestry and silviculture is that silviculture is applied to activities related to harvesting of timber and renewal of harvested areas, and forestry is broader. Complete regimes for renewal, tending, and harvesting forests are called silvicultural tasks and related systems. So, active management may be required for silviculture management, whereas passive management may be used in forestry management without the application of a forest stand-level treatment. Forest management (silviculture management) may be divided into assessing, renewal, tending, and harvesting techniques. Assessment may be further divided into assessing the quality and quantity of timber before harvest, and the growth of trees after renewal. The assessment of the quantity and quality of trees before harvesting may also be called estimating or developing a forest resource inventory, developing a forest vegetation inventory, or similar terms (such as, forest-inventory management). Accurate forest inventory information is critical to the success of the forest industry. (In a similar way, accurate estimates of mineral resources are critical to the mining industry.) Furthermore, the planning of harvesting, renewal and tending activities requires accurate information about the terrain, such as absolute elevation and local terrain slope, which determine drainage of water and operability of silvicultural machinery.

SUMMARY

Systems configured to estimate forest inventory and terrain were researched, and some problems were found. After much study, an understanding of the problem and its solution has been identified, which are stated below.

Forest information about the distribution of hardwood and softwood timber (within a given area), the heights of the trees, the volume of the tree, and the basal areas of the trees, as well as other types of forest information, is particularly useful for forest-product companies and/or government agencies for the purpose of predicting or forecasting the forest resource inventory and the supply of hardwood inventory and/or of softwood inventory that may be expected to be available for tree harvesting activities from the land depicted in a forest image or an image (one or more images or forest images). The forest image (sometimes referred to herein as "image") may include an in-flight image, an airborne image, or a space-borne image. For example, the image may be acquired from a sensor positioned on a vehicle in flight (during flight of the vehicle above the Earth's surface). Examples of the vehicle in flight may include: (A) an airborne vehicle (such as, an aircraft or a drone), and (B) a space-borne vehicle (such as, a satellite or a space shuttle). In general terms, the definition of an in-flight vehicle is a vehicle that moves above the surface of the Earth (and any suitable distance from the surface of the Earth), and may include (for example and not limited to) an airplane, a drone, a space-borne vehicle, a satellite, a rocket, etc. The information is, in turn, crucial to the planning of silvicultural and tree-harvesting operations, scheduling and budgeting operations of timber-processing facilities, identifying location and placement of the facilities, and/or building and sizing the facilities to be associated with a given area identified in the airborne or space-borne image, in which the facilities are expected to derive forest feedstock to sustain ongoing operations. Miscalculations of timber volume can be very costly (or other factors), particularly if the miscalculations result in the shutting down of a tree-processing facility (plant) for lack of feedstock, or the necessity of having to replace feedstock that is only realizable at significant extra expense. In summary, information on the tree height, tree species, percent softwood basal area (and its mathematical complement, percent hardwood basal area, which equals 100% minus the percent softwood basal area), and other measurements of trees and stands of trees over large territories are useful to the forest industry. Furthermore, detailed information about the terrain is particularly useful for forest-product companies and government agencies for such purposes as mapping probable locations of streams, for determining the placement of roads, and for determining the path of timber harvesting equipment during operations.

Known systems, configured to estimate forest inventory, provide hardwood and softwood inventory calculations (estimates) by visually interpreting conventional aerial photographic images in a process for estimating forest inventory. They also provide information on attributes, such as stand height and density. This process is both lengthy (i.e. the number of photo-interpreted hectares of forest per hour is low), subjective, and error prone. It has been demonstrated that different photo-interpreters, given the same data and tools, will produce different, often conflicting interpretations of the same forest. Errors concern both species composition and the attribute values. In some case, hardwood and softwood forest stands are confused. The duration of the photo-interpretation phase is at least two orders of magnitude longer than the acquisition of the imagery (for example, it may take, for instance, about 100 days to interpret the imagery acquired in one day of aerial surveys). The forest inventory maps are therefore delivered years after the acquisition, and are already out-dated at the moment they are made available to the forest industry users.

Known systems, configured to estimate forest inventory, provide hardwood and softwood inventory calculations (estimates) by using LiDAR images in a process for estimating forest inventory. LiDAR is a remote sensing technology that measures distance by illuminating a target with a laser and analyzing the reflected light. LiDAR is an acronym for Light Detection And Ranging (also known as airborne laser altimetry, or airborne scanning laser). LiDAR systems are used to make high-resolution three-dimensional maps, with applications in forestry management, geomatics, archaeology, geography, geology, geomorphology, seismology, remote sensing, atmospheric physics, and contour mapping. While LiDAR imaging techniques, depending on the embodiment, may produce more accurate hardwood and softwood volume calculations than by using conventional aerial photographic imaging, and may produce more detailed terrain information than conventional topographic mapping, LiDAR may be prohibitively expensive, and, as well, LiDAR data may not be readily available for more remote geographic areas. Because forest inventories need to be updated regularly (e.g. every five years), it is impractical to use LiDAR for this purpose.

Known systems, configured to estimate terrain, provide digital terrain models, are intended to represent the bare earth elevation of the terrain, even under forest canopies. Conventional methods rely on photo-interpretation of aerial photographs to draw elevation contour lines. These are both inaccurate, and spatially imprecise. Because photo-interpreters often do not see the bare terrain under forest canopies, they can only approximate its true elevation. Errors as high as 10 m are not uncommon. Moreover, contour lines only describe the elevation at the contour location, so they can be said to have a low resolution. The rest of the elevation information must be deduced by interpolation, with highly uncertain outcomes.

Known systems, configured to estimate terrain, provide digital terrain models, are intended to represent the bare earth elevation of the terrain, even under forest canopies. LiDAR offers both high accuracy and high spatial precision. The accuracy of LiDAR digital terrain models under forest canopies is 30 cm or better. The density of LiDAR returns having hit the ground allows for the creation of digital terrain models with a high resolution (e.g. 1 m pixel size). However, for such accuracy and precision levels to be achieved, the LiDAR sensors have to be flown at low altitude (typically below 2000 meters). This entails a large number of flight lines for a given territory, and hence, large costs. What is more, the LiDAR returns need to be classified into "ground" and "not-ground" categories. Part of this classification is done manually by technicians, and represents a significant portion (e.g. 20%) of the data production costs.

More recently, the quality of conventional photographic aerial photographic images has been improved by using digital aerial cameras (sensors), such as: (A) the ADS-40 (TRADEMARK) system and the ADS-80 (TRADEMARK) system both manufactured by LEICA Geosystems AG (located in Switzerland); (B) the VEXCEL (TRADEMARK) camera manufactured by Microsoft Inc. (located in the USA); and (C) the Z/I DMC IIe Series (TRADEMARK) camera manufactured by Z/I IMAGING GmbH (located in Germany). These are examples of an airborne digital imaging sensors configured to produce multispectral stereo orthorectified imagery. Nonetheless, interpretation of tree height and canopy openness remains difficult with ADS-40 images (and the like) alone, and it is nearly impossible to accurately estimate forest structure and volume, as stated in a web page document entitled "How a laser is helping researchers to see Ontario's Great Lakes-St. Lawrence forests more clearly." This document was published by the Ontario Forest Research Institute (Ontario, Canada) on the website (www.mnr.gov.on.ca), operated by the Ontario Ministry of Natural Resources & Forestry, and was available on this website as of 18 Nov. 2013.

In order to mitigate, at least in part, the problem(s) identified above, in accordance with an aspect of the present invention, there is provided an apparatus. The apparatus is configured for forest inventory. For example, forest inventory includes the identification of the forest species, or group of species (hardwood trees, softwood trees), as well as forest structural attributes, such as timber volume. More specifically, the apparatus is further configured to compute and to display hardwood inventory and softwood inventory of a forest (prior to the initiation of forest harvesting tasks) and detailed information of the terrain in the forest or anywhere else (that is, the apparatus is configured to also produce an enhanced digital terrain model (eDTM)).

In order to mitigate, at least in part, the problem(s) identified above, in accordance with an aspect of the present invention, there is provided a forest-inventory management apparatus for use with a forest image acquired from an in-flight vehicle. The apparatus includes a server system. The server system includes a processor assembly, and a non-transitory machine-readable storage medium configured to tangibly store a processor-executable programmed code. The processor-executable programmed code is configured to: (A) read data representing information of the forest acquired by airborne or space-borne sensors; (B) compute a supply of forest inventory expected to be available for harvesting from the forest depicted in the airborne or space-borne image; and (C) provide data representing the supply of forest resource inventory expected to be available for harvesting from the forest depicted in the airborne or space-borne image.

In order to mitigate, at least in part, the problem(s) identified above, in accordance with an aspect of the present invention, there is provided an apparatus for forest inventory management, which apparatus includes a server system. The server system includes a processor assembly, and a non-transitory machine-readable storage medium. The non-transitory machine-readable storage medium is configured to tangibly store a processor-executable programmed code, which is hereafter referred to as the program. The program is configured to compute (identify) a supply of hardwood inventory and of softwood inventory expected to be available for harvesting from land depicted in airborne or space-borne images. The program is further configured to read the multispectral imagery mosaics database and the field-plot database. The program is further configured to read hardwood estimation parameters, softwood estimation parameters, and other parameters related to classifying land and water that are calibrated based on data obtained from a multispectral imagery mosaics database and a field-plot database. The program is further configured to produce a forest output-cell attribute database based on the multispectral imagery mosaics database, the digital surface model database, the digital terrain model database, the calibration digital terrain model database, the land-use database and the field-plot database.

The apparatus may be further adapted such that the program is further configured to calibrate elevation error correction functions for a digital terrain model based on a land-use database, a calibration digital terrain model database, a digital terrain model database, and a multispectral image database. The program is further configured to enhance the digital terrain model based on the forest output-cell attribute database and a spot-elevation database and the digital terrain model database and a spot-elevation database and an error correction function database. The program is further configured to provide the enhanced digital terrain model. By way of example, the calibration digital terrain model database may include data representing representative LiDAR strips (imagery data). Alternatively, the calibration digital terrain model database may include photogrammetric digital surface model (DSM) from locations where the ground is bare because forest clear cuts from harvesting were conducted very recently before the imagery acquisition, or other areas with large areas of bare ground where DSM is available, so that the surface covered in the DSM is bare terrain and is thus representative of the terrain in these locations. The calibration digital terrain model database includes relatively higher detail (higher resolution) of digital terrain model data in comparison to the data contained in the digital terrain model database. The calibration digital terrain model database may be relatively more expensive to obtain per unit area (e.g. cost per unit area, or $/km$^2$) versus the cost of obtaining the data associated with the digital terrain model database. It will be appreciated that calibration is not restricted to a LiDAR calibration strip. Note the DSM referred to here is not to be confused with the digital surface model database. The calibration digital terrain database may be built (assembled) using a small portion of a DSM where the surface in the DSM is terrain and is not the canopy, and this can be determined, for example by looking at imagery and seeing bare ground in the imagery at the time the DSM was created.

The apparatus may be further adapted such that the program is further configured to produce dominant height canopy-height model output-cell attribute database.

The apparatus may be further adapted such that the program is further configured to calibrate forest attribute data based on the forest feature output-cell database, the canopy height model pixel database and the canopy-height output-cell attribute database. The program may be further configured to produce a forest output-cell attribute database.

In order to mitigate, at least in part, the problem(s) identified above, in accordance with an aspect of the present invention, there is provided a method associated with the apparatus. The method includes computing (identifying) a supply of hardwood inventory and of softwood inventory expected to be available for harvesting from land depicted in airborne or space-borne images. The method further includes reading the multispectral imagery mosaics database, the field-plot database, the digital surface model database, the digital terrain model database, the land-use database and the calibration digital terrain model database. The method further includes reading hardwood estimation parameters and softwood estimation parameters that are calibrated. The method further includes producing a forest output-cell attribute database based on the multispectral image database and the field-plot database.

The method may further include calibrating error correction functions for a digital terrain model based on a land-use database, calibration digital terrain model database, a digital terrain model database, a land-use database and a multispectral image database. The method may further include enhancing the digital terrain model based on the forest output-cell attribute database and a spot-elevation database and the digital terrain model database and a spot-elevation database and the error correction function database. The program is further configured to provide the enhanced digital terrain model.

The method may further include producing canopy-height output-cell attribute database.

The method may further include calibrating forest attribute data based on the forest output-cell feature database and the canopy-height model pixel database and the field plot database. The method may further include producing a forest output-cell attribute database.

In order to mitigate, at least in part, the problem(s) identified above, in accordance with an aspect of the present invention, there is provided a forest-inventory management apparatus. The forest-inventory management apparatus is for a forest image having forest information associated with a forest, and the forest image acquired from an in-flight vehicle, the forest-inventory management apparatus including: a server system, including: a processor assembly; and a non-transitory machine-readable storage medium being operatively coupled to the processor assembly, and being configured to tangibly store a forest-inventory management program, and the forest-inventory management program being configured to urge the processor assembly to execute operations, including: (A) reading data representing the forest image having the forest information associated with the forest; (B) computing data representing a supply of forest inventory of hardwood and softwood trees expected to be available for harvesting based on the forest information associated with in the forest image; and (C) providing the data representing a supply of forest inventory expected to be available for harvesting from the forest associated with the forest image.

In order to mitigate, at least in part, the problem(s) identified above, in accordance with an aspect of the present invention, there is provided a method. The method is for operating a forest-inventory management apparatus for a forest image having forest information associated with a forest, and the forest image acquired from an in-flight vehicle, the forest-inventory management apparatus including a server system, the server system including a processor assembly and a non-transitory machine-readable storage medium being operatively coupled to the processor assembly, and also being configured to tangibly store a forest-inventory management program, and the forest-inventory management program being configured to urge the processor assembly to execute the method, the method including: (A) reading data representing the forest image having the forest information associated with the forest; (B) computing data representing a supply of forest inventory of hardwood and softwood trees expected to be available for harvesting based on the forest information associated with in the forest image; and (C) providing the data representing a supply of forest inventory expected to be available for harvesting from the forest associated with the forest image.

In order to mitigate, at least in part, the problem(s) identified above, in accordance with an aspect of the present invention; there is provided an apparatus. The apparatus is for a processor assembly of a server system of a forest-inventory management apparatus, the forest-inventory management apparatus being for a forest image having forest information associated with a forest, and the forest image acquired from an in-flight vehicle, the apparatus including: a non-transitory machine-readable storage medium being configured to: operatively couple to the processor assembly; and tangibly store a forest-inventory management program, and the forest-inventory management program being configured to urge the processor assembly to execute operations, including: (A) reading data representing the forest image having the forest information associated with the forest; (B) computing data representing a supply of forest inventory of hardwood and softwood trees expected to be available for harvesting based on the forest information associated with in the forest image; and (C) providing the data representing a supply of forest inventory expected to be available for harvesting from the forest associated with the forest image.

In order to mitigate, at least in part, the problem(s) identified above, in accordance with an aspect of the present invention, there is provided a forest-feature output cell database, including: data representing forest feature cells, and the data being computed by a server system being configured to execute operations, including: (I) retrieve: (A) data representing multispectral imagery mosaics for large data files of the same territory, and the data being retrievable from a multispectral imagery mosaics database, and (B) data representing feature classification rules for classifying imagery pixels into feature cells representing a hardwood tree species group and a softwood tree species group and other features on a large territory, and the data being retrievable from a classification-rule database; (II) compute data representing the forest feature cells based on: (A) the data representing the feature classification rules for classifying imagery pixels into feature cells representing the hardwood tree species group, the softwood tree species group and said other features on the large territory, and (B) the data representing the multispectral imagery mosaics for large data files of the same territory that was retrieved; and (III) provide the data representing the forest feature cells, and the data being storable in the forest-feature output cell database.

In order to mitigate, at least in part, the problem(s) identified above, in accordance with an aspect of the present invention, there is provided a percent softwood basal area database. The percent softwood basal area database includes: data representing local percent softwood basal area of the forest within each forest feature cell, and the data being computed by a server system being configured to execute operations, including: (I) retrieve: (A) data representing multispectral imagery mosaics for large data files of the same territory, and the data being retrievable from a multispectral imagery mosaics database, and (B) data representing feature classification rules for classifying imagery pixels into feature cells representing a hardwood tree species group, a softwood tree species group and other features on a large territory, the data being retrievable from a classification-rule database; (II) compute data representing a local percent softwood basal area of the forest within each forest feature cell based on: (A) the data representing the feature classification rules for classifying imagery pixels into feature cells, and the data representing the estimation equations and ATSBs (the arithmetic transformation of spectral bands), and (B) the data representing the multispectral imagery mosaics for large data files of the same territory; and (III) provide the data representing the local percent softwood basal area of the forest within said each forest feature cell, and the data being storable in the percent softwood basal area database.

In order to mitigate, at least in part, the problem(s) identified above, in accordance with an aspect of the present invention, there is provided an enhanced digital terrain model database, including: data representing an enhanced digital terrain model containing values representing a local elevation of terrain within a forest feature cell, and the data being computed by a server system being configured to execute operations, including: (I) retrieve (A) data representing a digital terrain model, and the data being retrievable from a digital terrain model database, (B) data representing a digital surface model, and the data being retrievable from a digital surface model database, (C) data representing error correction functions for terrain curvature and for land-use, and the data being retrievable from an error-correction database, (D) data representing land-use, and the data being retrievable from a land-use database, (E) data representing spot elevation data for a large territory, and the data being retrievable from a spot-elevation database, (F) data representing forest feature cells, and the data being retrievable from a forest-feature output cell database; (II) compute the enhanced digital terrain model containing the values representing the local elevation of terrain within the forest feature cell based on: (A) the data representing the digital terrain model, (B) the data representing the digital surface model, (C) the data representing error correction functions for terrain curvature and for the land-use, (D) the data representing land-use, (E) the data representing the spot elevation data for the large territory, (F) the data representing the forest feature cells; and (III) provide data representing the enhanced digital terrain model containing the values representing the local elevation of terrain within the forest feature cell, and the data being storable in the enhanced digital terrain model database.

In order to mitigate, at least in part, the problem(s) identified above, in accordance with an aspect of the present invention, there is provided a dominant height canopy-height model output-cell attribute database, including: data representing dominant canopy heights containing output cells being stratified according to classified features and canopy heights, and the data being computed by a server system configured to execute operations, including: (I) retrieve: (A) data representing forest feature cells, and the data being storable in a forest-feature output cell database, (B) data representing canopy height model pixel data, and the data being storable in a canopy height model pixel database, and (C) data representing estimation parameters and coefficients, and the data being storable in a strata database; (II) compute data representing the dominant canopy heights containing the output cells being stratified according to the classified features and the canopy heights based on: (A) the data representing the forest feature cells, (B) the data representing the canopy height pixel data, and (C) the data representing the estimation parameters and the coefficients; and (III) provide the data representing the dominant canopy heights containing the output cells being stratified according to the classified features and the canopy heights, and the data being storable in the dominant height canopy-height model output-cell attribute database.

In order to mitigate, at least in part, the problem(s) identified above, in accordance with an aspect of the present invention, there is provided a forest output-cell attribute database, including: data representing forest attributes containing output cells being stratified according to classified features and canopy heights, and the data being computed by a server system being configured to execute operations, including: (I) retrieve: (A) data representing forest feature cells, and the data being storable in a forest-feature output cell database, (B) data representing canopy height model pixel data, and the data being storable in a canopy height model pixel database, and (C) data representing estimation parameters and coefficients, and the data being storable in a strata database; (II) compute data representing the forest attributes containing the output cells being stratified according to the classified features and the canopy heights based on: (A) the data representing the forest feature cells, (B) the data representing the canopy height pixel data, and (C) the data representing the estimation parameters and the coefficients; and (III) provide the data representing the forest attributes containing the output cells being stratified according to the classified features and the canopy heights, and the data being storable in the forest output-cell attribute database.

In order to mitigate, at least in part, the problem(s) identified above, in accordance with an aspect of the present invention, there is provided a canopy height model pixel database, including: data representing canopy height pixel data, and the data being computed by a server system being configured to execute operations, including: (I) retrieve: (A) data representing a digital surface model, and the data being retrievable from a digital surface model database, and (B) data representing an enhanced digital terrain model, the data being retrievable from an enhanced digital terrain model database; (II) compute data representing a canopy height data pixel based on: (A) the data representing the digital surface model, and (B) the data representing the enhanced digital terrain model; and (III) provide the data representing the canopy height data pixel, and the data being storable in the canopy height model pixel database.

Other aspects of the present invention and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIGS. 2A-1, 2A-2, 2A-3, 2A-4, 2A-5, 2A-6, 2A-7 and 2A-8 (SHEETS 2 to 9° F. 21 SHEETS) depict schematic representations of embodiments of a forest-inventory management program (processor-executable programmed code) to be deployed on the server system of FIG. 1;

FIG. 3 (SHEET 11 OF 21 SHEETS) depicts a first program of the processor-executable programmed code of FIG. 2A-1, in accordance with an embodiment of the present invention;

FIG. 4 (SHEET 12 OF 21 SHEETS) depicts a second program of the processor-executable programmed code of FIG. 2A-1 in accordance with an embodiment of the present invention;

FIG. 5 (SHEET 13 OF 21 SHEETS) depicts a third program of the processor-executable programmed code of FIG. 2A-1, in accordance with an embodiment of the present invention;

FIG. 6 (SHEET 14 OF 21 SHEETS) depicts a fourth program of the processor-executable programmed code of FIG. 2A-1, in accordance with an embodiment of the present invention;

FIG. 7 (SHEET 15 OF 21 SHEETS) depicts a fifth program of the processor-executable programmed code of FIG. 2A-1, in accordance with an embodiment of the present invention;

FIG. 8 (SHEET 16 OF 21 SHEETS) depicts a sixth program of the processor-executable programmed code of FIG. 2A-1, in accordance with an embodiment of the present invention;

Figure 1:
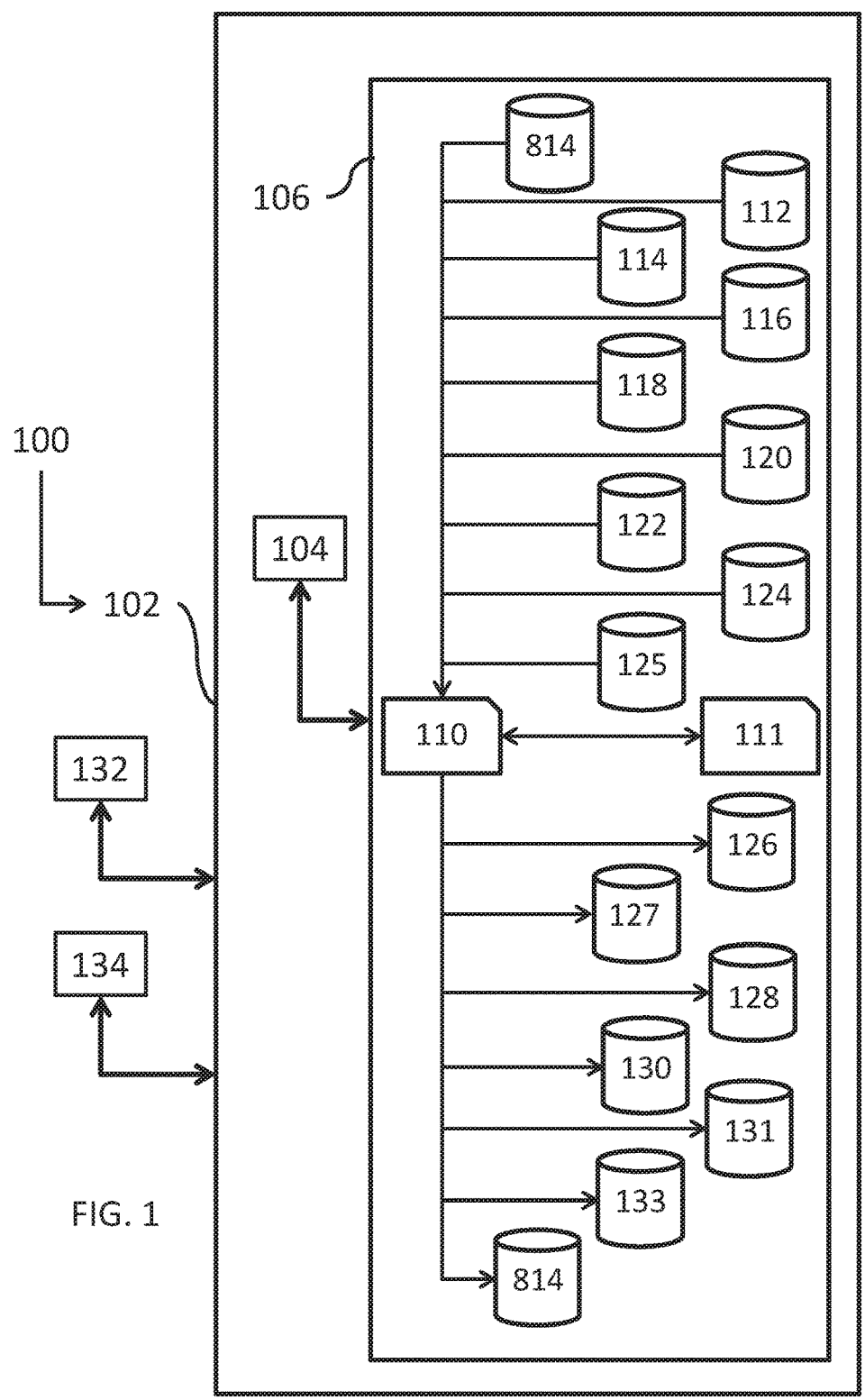
FIG. 1 (SHEET 1 OF 21 SHEETS) depicts a schematic representation of an apparatus including a server system, in accordance with an embodiment of the present invention.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 100 forest-inventory management apparatus
102 server system
104 processor assembly
106 non-transitory machine-readable storage medium
110 processor-executable programmed code (or forest-inventory management program)
111 auxiliary processor-executable program (or auxiliary program)
112 spot-elevation database
114 multispectral imagery mosaics database
116 digital terrain model database
118 field-plot database
120 classification-rule database
122 land-use database
124 calibration digital terrain model database
125 digital surface model database
126 forest-feature output-cell database
127 canopy height model pixel database
128 dominant height canopy-height model output-cell attribute database
130 forest output-cell attribute database
131 percent softwood basal area database
132 input device
133 enhanced digital terrain model database
134 output device
200 first program
202 second program
204 third program
206 fourth program 208 fifth program
210 sixth program
212 seventh program
214 forest-feature trait
216 canopy-height attribute
218 short class
220 medium class
222 tall class
224 tree-species groupings feature
226 hardwood class
228 mixed wood class
230 softwood class
232 attribute
234 additional feature
236 bare-ground class
238 water class
239 other class
302 to 522 operation
524 error-correction database
602 to 622 operation
702 to 710 operation
802 to 812 operation
814 strata database
902 to 906 operation
910 blue dots
912 red line
914 hardwood plots

DETAILED DESCRIPTION OF THE
NON-LIMITING EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a".

FIG. 1 depicts a schematic representation of a forest-inventory management apparatus (100). In general terms, the forest-inventory management apparatus (100) is configured for forest inventory (and/or for terrain inventory). Forest inventory includes the identification of the forest species, or group of species (hardwood trees, softwood trees), as well as forest structural attributes such as timber volume. Forest terrain includes the elevation of the terrain under and around the forest. More specifically, the forest-inventory management apparatus (100) is further configured to compute and to display hardwood inventory and softwood inventory of a forest prior to the initiation of forest harvesting tasks. As well, a method is associated with the forest-inventory management apparatus (100).

Referring to the embodiment depicted in FIG. 1, the forest-inventory management apparatus (100) is for a forest image having forest information associated with a forest. The forest image was acquired from an in-flight vehicle. The forest-inventory management apparatus (100) includes a server system (102). The server system (102) includes a processor assembly (104) and a non-transitory machine-readable storage medium (106) operatively coupled to the processor assembly (104). The non-transitory machine-readable storage medium (106) is configured to tangibly store a forest-inventory management program (110). The forest-inventory management program (110) is configured to urge the processor assembly (104) to execute operations. The operations include: (A) reading data representing the forest image having the forest information associated with the forest; (B) computing data representing a supply of forest inventory of hardwood and softwood trees expected to be available for harvesting based on the forest information associated with the forest image; and (C) providing the data representing a supply of forest inventory expected to be available for harvesting from the forest associated with the forest image.

In more specific terms, the forest-inventory management apparatus (100) is configured to extract forest features across a large territory using multispectral imagery (also called a forest image). The forest-inventory management apparatus (100) is configured to analyze airborne or space-borne images (forest image) of forested areas. The forest-inventory management apparatus (100) is also configured to extract information from the airborne or space-borne images (forest images) of forested areas. The forest-inventory management apparatus (100) is also configured to analyze the extracted information from the airborne or space-borne images to determine terrain, volumes, heights, basal areas, and other attributes of hardwood resources and softwood resources located in the airborne or space-borne images. The forest-inventory management apparatus (100) is also configured to use DTM, land-use data, spot elevations (i.e., not just information from images).

For instance, the forest-inventory management apparatus (100) may (advantageously) overcome, at least in part, the known problems associated with estimating forest structure, terrain and forest volume by using: (A) images generated (captured) by the ADS-40 airborne digital sensor (and the like) for such calculations; or (B) images from similar airborne digital sensors, while avoiding the relatively higher costs associated with the use of LiDAR images for the same purpose (if so desired); or (C) images from similar space-borne digital sensors; and/or (D) digital terrain models from airborne or space-borne digital sensors; and/or (E) digital surface models from airborne or space-borne digital sensors; and/or (F) land-use data. The ADS-40 (TRADEMARK) airborne digital sensor is manufactured by LEICA Geosystems AG based in Switzerland. ADS stands for "Airborne Digital Sensor".

In digital imaging, a pixel (picture element) is a physical point in the digital image, and/or the smallest addressable element in a display device. The pixel may be the smallest controllable element of a digital picture represented on a screen or a display. The address of a pixel may correspond to the physical coordinates of the pixel. For example, pixels may be represented using dots or squares. Each pixel is a sample of an original image; more samples per unit area typically provide more accurate representations of the original image. The intensity of each pixel may be variable. In color image systems, a color is typically represented by three or four component intensities such as red (red light), green (green light), and blue (blue light), or near infrared (near infrared light). In some contexts (such as descriptions of camera sensors), the term pixel is used to refer to a single scalar element of a multi-component representation (more precisely called a photo site in the camera sensor context), while in others the term may refer to the entire set of such component intensities for a spatial position.

For example (and not limited thereto), the forest-inventory management apparatus (100) is configured to classify hardwood portions and softwood portions of the forest canopy with multispectral imagery of appropriate resolution (high resolution, such as 50×50 cm, up to pixel sizes that to not greatly exceed the size of the output cells), into, for example, 20 meter×20 meter hardwood pixels (also called hardwood output cells), softwood pixels (also called softwood output cells), and mixed wood pixels (also called mixed wood output cells). For the sake of convenience, the terminology to be used is "output cells" as opposed to "pixels". The forest-inventory management apparatus (100) is configured to determine tree volume by hardwood, softwood and mixed wood in, for example, 20 meter×20 meter output cells. It will be appreciated that the output cells can be any size such as 5 meter×5 meter or 20 meter×20 meter or 30 m×30 m. Tree height is needed to determine tree volume. To determine tree height, the absolute elevation of the tree crown surface (forest canopy) and the elevation of the terrain are needed. According to known methods, LiDAR is a reasonably accurate method used to get (obtain) the terrain elevation, or what is called a digital terrain model (DTM). LiDAR image data, as stated earlier, is not always readily available for a particular forested area, and where available, is (as stated earlier) relatively expensive to obtain. Accordingly, the forest-inventory management apparatus (100) may be configured to determine tree height by enhancing a DTM (Digital terrain Model) from a variety of other sources (in the absence of LiDAR image data if so desired). The "digital terrain model" (DTM) is a set of computer files that describe the elevation and geographic coordinates of the bare earth terrestrial surface of the Earth. Generally, the data is described in pixels of a specific resolution for each DTM. A pixel has a square shape, and the resolution of the pixel describes the length of the side of the square. For example, a high resolution DTM may have one meter pixels, and a low resolution DTM may have 90 meter pixels. The DTM may be called a digital elevation model (DEM), raster relief map, etc. The stereophotogrammetric analysis of high resolution imagery gives a DSM (digital surface model) from which the forest-inventory management apparatus (100) can compute (deduce) the canopy elevation. The digital surface model (DSM) may also be provided by other sources than the multispectral high-resolution imagery. The "digital surface model" (DSM) is a similar set of computer files that describes the elevation and geographic coordinates of the surface of the Earth visible from the air. This surface may or may not be the same elevation as the terrain. For example, the roof of a house is a surface which is not the same as the surface of the Earth, or the terrain (likewise for the height of the canopy of a forest). The DSM for the surface of a road will, however, be equal to the DTM for the case where the road is at ground level (i.e., not a bridge). The difference, [DSM] minus [DTM], gives the tree height (unless the difference is zero which means there are no trees, such as when there are lakes and roads). DTM is determined from the following readily available (and relatively cheaper) sources, such as: Shuttle Radar Topography Mission (SRTM) data, state, provincial or country level topographical maps (from digital contour lines), state, provincial or country level digital elevation models, such as the Canadian Digital Elevation Data (CDED), or from data of the future TanDEM-L InSAR mission from the German Space Agency (DLR).

The forest-inventory management apparatus (100) includes a server system (102). The server system (102) includes a processor assembly (104) and a non-transitory machine-readable storage medium (106), which may be called a memory assembly. The non-transitory machine-readable storage medium (106) is configured to tangibly store a processor-executable programmed code (110). The processor-executable programmed code (110) is hereafter referred to as the forest-inventory management program (110). The forest-inventory management program (110) includes operations to be described in connection with the remaining Figures. It may be appreciated that some operations of the forest-inventory management program (110) may be provided by an auxiliary processor-executable program (111) for the case where these operations are readily available by another vendor. For example, the auxiliary processor-executable program (111) may be configured to compute statistical operations on data, to perform data mining and classification operations on data, etc.

The non-transitory machine-readable storage medium (106) is also configured to tangibly store data. The data may include the following; a spot-elevation database (112); a multispectral imagery mosaics database (114); a digital terrain model database (116); a field-plot database (118); a classification-rule database (120); a land-use database (122); a calibration digital terrain model database (124); a digital surface model database (125); a forest-feature output cell database (126); a canopy height model pixel database (127); a dominant height canopy-height model output-cell attribute database (128); a forest output-cell attribute database (130); a percent softwood basal area database (131); an enhanced digital terrain model database (133); an error-correction database (524); and a strata database (814).

An input device (132) is operatively coupled to the server system (102), and is configured to interface the user to the server system (102). The input device (132) is configured to receive user inputs for user commands and/or data, and to transmit the user commands and/or data to the server system (102). Examples of the input device (132) may include a keyboard, a mouse, a scanner, a memory device for storing data, a modem, an Internet connection, etc. An output device (134) is operatively connected to the server system (102), and is configured to transmit the output of the server system (102) to the user of the server system (102). Examples of the output device (134) may include a display assembly, a printer system, etc.

The definition of a landscape (or an ecosystem) is defined and used herein to mean a region with substantive similarities in topography and vegetation types. For example, the boreal forest that lies on the Canadian Shield that covers much of Canada and Russia would be considered a single landscape (or a single ecosystem). The coastal temperate rain forests of the west coast of Canada and the United States are a different landscape (an ecosystem). Within a single landscape (or a single ecosystem), there are similarities in slope, elevation and vegetation types. For example, the trees in the Canadian Shield are mostly less than about 25 meters in height, whereas in the west coast temperate rainforests, they can range as high as about 50 meters. Terrain on the Canadian Shield may have moderate mountains, rolling topography or flat topography, in contrast to the Canadian coastal mountains which have tall mountains with steep slopes.

The definition of a large territory is defined and used herein to mean an area of dozens to hundreds or thousands of square kilometers within a landscape (or an ecosystem). For example, within the province of Ontario, Canada, there are approximately 40 administrative zones known as Forest Management Units. The larger instances of the Forest Management Units are in excess of about 10,000 square kilometers ($km^2$). There are minor variations in vegetation, such as height, growth and composition of forest stands between large territories, for which it is beneficial to calibrate the forest-inventory management program (110) to achieve greater accuracy of results.

The term "pixels" is defined and used herein as the smallest spatial unit of the input imagery, digital terrain models, and digital surface models. A pixel may have the shape of a square. The resolution describes the length of the side of the square.

The term "cells" is defined and used herein to mean the smallest spatial unit of the output data. A cell may have the shape of square. The resolution describes the length of the side of the square. The cell resolution can be the same or different than the pixel resolution.

The term "features" is defined and used herein to mean tree species groupings from the forest in a large territory, and include non-forest types such as exposed ground, water, shrubs, etc. The features are obtained and classified from the recorded brightness at different wavelengths, or functions thereof, and are extracted from airborne or space-borne images. For example, features may include hardwood, softwood and mixed wood (part hardwood, part softwood) forest stands; and non-forest features such as ground and water. Features also include ground, water, shrubs, and other items that may be used to calibrate the forest-inventory management program (110) (depicted in FIG. 1) along with tree species groupings.

The term "terrain" is defined and used herein to designate the bare earth surface of land topography; in other words, the ground surface. In open areas, the terrain corresponds to the Earth's surface visible from above; however, in forested areas, the terrain corresponds to the forest floor, not the canopy surface. Terrain elevation is the absolute elevation of the bare earth surface (e.g. above mean sea level, or above the Earth ellipsoid).

The term "Digital Terrain Model" (DTM) is defined and used herein to designate a computer representation of the terrain elevation for any location in a territory (e.g. defined by way of longitude and latitude, or plane coordinates), or for any portion of, (or all of), the Earth's surface. The DTM can take the form of: (A) a raster file in which pixels with coordinates (for example, longitude and latitude, or plane coordinates) contain the local terrain elevation value; (B) a triangulated irregular network (TIN) in which each vertex of the triangles is an XY point (where XY represents the coordinates for example, longitude and latitude, or plane coordinates) with a terrain elevation value (for example meters above sea level); or (C) a dense set of XY points with a terrain elevation value. The quality of a DTM is determined by its resolution (pixel size, or size of the smallest resolved 3D (three dimensional) topographical feature, and the accuracy (the deviation between the terrain elevation and the computer representation of the terrain elevation).

The term "enhanced digital terrain model" (eDTM) is defined and used herein in relation to the original DTM from which the eDTM was derived. The enhancement concerns its quality. An enhanced DTM (eDTM) is a version of the DTM in which the resolution was significantly improved (e.g., a smaller pixel size or a smaller size of the smallest resolved 3D topographical feature, e.g. from a pixel size of 30 meters to a pixel size of 5 meters), and in which the accuracy was also significantly improved (e.g., from an average deviation between the terrain elevation and the computer representation of the terrain elevation of 5 meters to an average deviation of 2 meters).

The term "forest attributes" is defined and used herein to designate as the characteristics of forest stands that are of interest to users of the forest-inventory management apparatus (100). Forest workers can measure various attributes from forest sample plots. The forest-inventory management program (110) is configured to estimate the forest attributes for the large territory. Forest attributes may include such information as volume of merchantable timber, tree height, tree density, and basal area (of the trees). The basal area is the sum of the cross-sectional area at breast height of tree stems. Basal area defines the area of a given section of land that is occupied by the cross-section of tree trunks and stems at their base. In most countries, this is usually a measurement taken at the diameter at breast height of a tree above the ground and includes the complete diameter of every tree, including the bark. Measurements are usually made for a land plot, and this is then scaled up for one hectare of land for comparison purposes to examine the productivity and growth rate of a forest.

The arithmetic transformation of spectral bands (ATSB) is defined and used herein to designate the arithmetic transforms of the intensity of the light at specific wavelengths or bands of wavelengths (such as, red, blue, green, infrared, etc.) emanating from an object and recorded in a pixel of the multispectral imagery. The ATSB can be a ratio (such as, infrared to red ratio), a ratio of sums or differences (such as, {infrared/(blue+green+red+infrared)}, or may be another arithmetic transformation.

Referring to FIG. 1, there is depicted the spot-elevation database (112), also called (INPUT DATA 1), including (data representing) spot elevation data for a large territory. The spot-elevation database (112) includes, for example, data indicating sparsely distributed spot elevations for a large territory. Many public agencies (government agencies) collect and provide topographical data. Spot elevations are the elevations in spots such as the peaks of hills and bottoms of valleys, and sometimes water bodies such as lakes and ponds that do not fall on a contour line. They are known to be more accurate than the elevation values of contour lines. This information is often provided in digital format containing XYZ data (such as longitude, latitude and elevation). FIG. 2C depicts a schematic example of a spot-elevation extracted from data stored in the spot-elevation database (112), and the cross represents an elevation spot having an elevation of about 624 meters. The spot-elevation database (112) (also called input data) is useful, but not mandatory. It will be appreciated that the spot-elevation database (112) does not store images. The spot-elevation database (112) is configured to store elevations and their coordinates. The images were made (manufactured) to illustrate the spot elevation shown with a marker (such as, an X, etc.).

Referring to FIG. 1, there is depicted the multispectral imagery mosaics database (114) (also called the INPUT DATA 2), including data representing (including or having) multispectral imagery mosaics for large data files of the same territory. In some embodiments, the multispectral imagery mosaics database may contain data representing a multispectral imagery mosaic which is made up two multispectral imagery mosaics taken at different times (such as, winter and summer) from which a new temporary multispectral imagery mosaic is derived for use by the forest-inventory management apparatus (100). Generally, the data representing the multispectral imagery mosaics for the large data files includes multispectral imagery mosaics taken at different times for the same territory, such as at different times of the year (for instance, the summer images and the winter images). It will be appreciated that sometimes, an ATSB using summer images and winter images may be used (if so desired), and sometimes ATSB using other images (taken at other times or seasons) may be used. Preferably, when calibrating the features, the best ATSB is picked. The summer ATSB and the winter ATSB may be the best, or another may be the best (depending on the prevailing circumstances). It will be appreciated that the multispectral imagery mosaics are needed. The multispectral imagery mosaics database (114) includes, for example, data indicating multispectral image mosaics for large territories in large data files, such as the digital surface model (DSM) that is contained in the digital surface model database (125). It will be appreciated that the digital surface model database (125), which contains the DSM, may come from (may be derived from) another suitable source other than the multispectral imagery mosaics database (114) (if so desired). The "imagery" actually comes in a set of different files; the images may be provided in TIFF-formatted files, and the DSM is provided in another type of file. It will be appreciated that the digital surface model database (125) may be derived from (extracted from) the multispectral imagery mosaics database (114) or the digital surface model database (125) may be derived from another suitable source (if so desired). TIFF files are an industry standard file type for distributing high quality scanned images or finished photographic files (these contain more information than compressed JPEG files and take up more memory space).

The digital surface model database (125) (also called the input data 8 or the DSM) is data (contained in a file or files) that describes the height and geographic coordinates of the surface of the Earth visible from the air or from space. Multispectral image mosaics are acquired by aerial photography using photographic sensors affixed to aircraft that fly in patterns over large territories or acquired by sensors affixed to spacecraft that orbit the Earth in patterns. The resulting imagery is referred to as "multi-spectral" because the imagery includes data from multiple parts of the visible spectrum and infrared spectrum; for example, it may contain data for red light, green light, blue light, panchromatic light, and near infrared light. Generally, two or more views of the same spot on the Earth's surface are acquired by the sensors. This enables other data to be derived from the imagery data, such as a digital surface model (DSM) by using a known stereo-matching technique or by using known apparatus configured to perform stereo-matching technique. More generally, the digital surface model database (125) may be derived from the multispectral imagery mosaics database (114). Alternatively, the digital surface model database (125) may be derived by any other suitable source involving image matching and photogrammetric surface reconstruction based on airborne or space-borne images generated in panchromatic, multispectral or radar bands, or interferometric processing of airborne or satellite (space-borne) synthetic aperture radar (InSAR), or airborne scanning LiDAR (etc.). These DSM products are derived through photogrammetric and statistical techniques from the raw data. The DSM provides information about the elevation of pixels representing all the surfaces visible from the sky (from above the terrain), which may include land, water, and forest canopy. The raw data from these sensors is often provided in strips that correspond to flight lines of an aircraft or a spacecraft. The strips can be broken into squares or rectangles that may correspond to square or rectangular portions of the surface of the Earth, such as one kilometer (km) by one kilometer (km) (that is, 1 km×1 km), or five kilometers (km) by ten kilometers (km) (that is, 5 km×10 km); that is, one km by one km, or five km by ten km or any other tile size the vendor of the data chooses. These are known as tiles, and the collection of tiles is known as a mosaic. The tiles may be also be orthorectified and geo-referenced. It will be appreciated that the digital surface model database (125) is not limited to the examples described.

It will be appreciated that the digital surface model database (125) is a separate input database from the multispectral imagery mosaics database (114). It will be appreciated that a DSM may be extracted from multispectral imagery, and (however) sometimes a vendor of multispectral imagery may do the extraction (if requested) for an end user and supply the DSM database (in such a condition). It will be appreciated that there are other potential ways to get (obtain) DSM data other than the multispectral, and therefore this description is not limited to the DSM from the multispectral imagery.

Digital satellite (or other spacecraft) images and aerial images play an important role in general mapping. First, they help provide a solid visual effect. In addition, the second, and perhaps more vital role, is to provide a basis for gathering spatial information. Examples of this are features such as roads, vegetation, and water. Before this information can be gathered in a manner that is useful for a mapping, the spacecraft image data or aerial photographs must be prepared in a way that removes distortion from the image. This process is called "orthorectification". Without this process, it would be very difficult to carry out functions such as making direct and accurate measurements of distances, angles, positions, and areas. "Orthorectified" means that it is of a uniform scale in the x direction and the y direction, (for example west and north), thus it can be measured in the same way a map is measured. "Georeferenced" means that the latitude and longitude, or the equivalent measure, such as, for example, Universal Transverse Mercator (UTM) coordinates, of any point on the tile is defined. In conjunction with the DSM, this means the XYZ coordinates (for example longitude, latitude and elevation) of any point on the tile are known. The resolution of the imagery may be high for the forest-inventory management program (110) to identify features and attributes, for example, better than one or two meter resolution. Generally, the supplier of the imagery may provide various embodiments of the data products described above.

Referring to FIG. 1, there is depicted the digital terrain model database (116), also called INPUT DATA 3, including data representing (having or including) a digital terrain model. The digital terrain model database (116) includes, for example, data presenting digital terrain model for the large territory. It will be appreciated that the digital terrain model (DTM) may include (by way of example and not limited thereto) a collection of squares or pixels representing a portion of, or all of, the Earth's terrain elevation. For each pixel, the coordinates are provided or known. In one embodiment, the XYZ coordinates (for example: longitude, latitude and elevation) of the center points of the pixels are known. Various agencies use satellites to acquire synthetic aperture radar (SAR) data or InSAR data (the interferometric synthetic aperture radar data), or PolInSAR (polarimetric interferometric SAR) of the Earth's topography to create DTMs and any equivalent thereof. InSAR stands for interferometric synthetic aperture radar. For example, the National Geospatial-Intelligence Agency (NGA) and the National Aeronautics and Space Administration (NASA) jointly conducted the Shuttle Radar Topography Mission (SRTM). The SRTM acquired data (and any equivalent thereof) with which to build a digital terrain model (DTM) of the Earth's surface with 30 meter or 90 meter pixel resolution. It will be appreciated that other equivalent type of data may be used in place of the data derived from the SRTM. Likewise, the European Space Agency (ESA), the German Space Agency (DLR), and the Canadian Space Agency (CSA) have developed, or are developing, digital terrain models based on SAR (Synthetic Aperture Radar). It will be appreciated that a DTM may be acquired from any type of in-flight vehicle including, for example, an aircraft, a drone, a satellite or the space shuttle, etc. It will be appreciated that the in-flight vehicle is not limited to any one type of in-flight vehicle, such as a satellite. Except for DTMs acquired with aerial laser scanning (such as, the LiDAR system), DTMs may contain important elevation errors. It will be appreciated that LiDAR data also contains errors, but the LiDAR errors are significantly smaller relative to other types of data (at the present time). It can be safe to presume that the elevation data provided by the LiDAR data may be treated as "true" elevations (that is, without error and/or within an acceptable level of error). Once other data sources become available that have an even lower level of errors than LiDAR, then those data sources may be used in place of LiDAR.

Referring to FIG. 1, there is depicted the field-plot database (118), also called INPUT DATA 4, including (data representing or having) field plot data with classes of forest features with geographic reference locations. The field-plot database (118) includes, for example, data representing field plot data with classes of forest features, with geographic reference locations. Field plots are collected in the usual way for forest inventory. A field plot is a small plot of land, for example about 400 square meters (m$^2$), in which detailed measurements of forest features and forest attributes are taken. The data from the field plots may be compared with the other input data and intermediate output data produced by the forest-inventory management program (110) to calibrate the forest-inventory management program (110) for a particular large territory (as for a coastal forest). A coastal forest compared to the boreal forest is a landscape (or an ecosystem), and is not considered to be a large territory. Users of the forest-inventory management program (110) can collect whatever attribute data is relevant to their purposes. The data includes such things as: (i) features, (ii) heights, and (iii) attributes. The features may include species of every tree whose diameter at breast height (dbh) is over a defined amount, for example, about 12 cm (centimeters). The heights may include the heights of several types of trees (for example, three types of trees) that are located in the dominant stratum (or for example two trees of every species of tree in the dominant canopy). The dominant stratum is the top layer of the canopy, excluding very tall unique trees that stand above the canopy.

The attributes may include: (A) volume of merchantable timber or total timber volume in each plot; (B) the total basal area of the trees in the plot (sum of the cross sectional area of trees, measured at breast height); (C) the diameter of every tree whose dbh is greater than a defined amount, for example, about 12 centimeters (cm); and/or, (D) the geographic data. The geographic data may include a precise geolocation to within a defined accuracy, for example, less than 1 meter (m) error in location of the center (for a circular plot) or corners (for a square or rectangular plot). It will be appreciated that "dbh" is the diameter at breast height, and that dbh is a common measurement of trees in silviculture.

Referring to FIG. 1, there is depicted the classification-rule database (120), also called INPUT DATA 5. The classification-rule database (120) includes data representing (having) feature classification rules for classifying imagery pixels into feature cells, and the data representing the estimation equations and ATSBs (the arithmetic transformation of spectral bands). The classification-rule database (120) includes, for example, data representing rules for classifying output cells. Each output cell can be classified according to a single feature, for example, a hardwood output cell or a softwood output cell. The rules could state, for example, that an output cell is: (A) a hardwood output cell if it contains at most 20 percent softwood basal area; (B) a mixed wood output cell if it contains more than 20 percent softwood basal area and less than 80 percent softwood basal area; (C) a softwood output cell if it contains at least 80 percent softwood basal area; and/or (D) a water output cell (for example, surface of a lake) based on some values from the imagery. It will be appreciated that classifying imagery into general classes such as water, bare earth and vegetation is a standard technique in remote sensing and mapping. It will be appreciated that persons of skill in the art understand the known method for classifying imagery into hardwood, softwood or mixed wood, which is an error-prone method. Estimating percent softwood basal area and then using percent softwood basal area to classify output cells into hardwood, softwood or mixed wood is not, however, a standard remote sensing technique. It will be appreciated that persons of skill in the art understand the known method for classifying imagery into water and earth (this is a standard technique, and therefore an explanation is not provided for this known method.) It will be appreciated that persons skilled in the art know how to classify hardwood and softwood, and since this method has so much error associated with it, this method is not often used commercially (for that reason). An aspect of the embodiment adds a unique operation, which is a computation for computing (calculating) percent softwood basal area, and use the computational result to classify hardwood, softwood and mixed wood. As shown in FIG. 10D, the relationship between (A) the percent softwood basal area (stored in the percent softwood basal area database (131)) and (B) the percent softwood basal area in the field plots (stored in the field-plot database (118)) is very strong. Thus, the percentage softwood basal area may be used to more accurately classify hardwood, softwood and mixed wood, and this is shown in FIG. 10D.

Each feature cell value is obtained by classifying the imagery pixel(s) intersecting the feature cell, using rules applied to pixels that classify pixels into classes, such as pure hardwood, pure softwood, mixed forest, water, etc., based on the ATSBs derived from the imagery pixels. In an embodiment; the rules classify the average information from several pixels to determine the class of the feature cell. This embodiment may apply for the case where the cell is bigger than the pixels (the pixels are aggregated into cells). In another embodiment, the rules classify a single pixel and apply that class to one or more feature cells. This second embodiment applies when the pixel are the same size or bigger than the cells (the pixels are split into cells).

Referring to FIG. 1, there is depicted the land-use database (122), also called INPUT DATA 6 or a public land-use database. The land-use database (122) includes data representing the state of land-use (land-use data) near the time of acquisition of the digital terrain model database (116). The land-use database (122) includes, for example, land-use data (the Landsat imagery may provide land-use data). Many public agencies (government agencies) collect and provide data for public-use data and/or land-use data. Frequently, this is based on Landsat space-based moderate-resolution land remote sensing data, a product of the US Geological Service and NASA. The Landsat (Land Satellite) program is the longest running enterprise for acquisition of satellite imagery of the Earth. The instruments on the Landsat satellites have acquired millions of images. The images, archived in the United States and at Landsat receiving stations around the world, are a unique resource for global change research and applications in agriculture, cartography, geology, forestry, regional planning, surveillance and education. Landsat data may have eight spectral bands with spatial resolutions ranging from about 15 meters to about 60 meters; the temporal resolution is about 16 days. The land-use data can be generated by the Landsat data by public or private agencies. In this option of the forest-inventory management program (110), the land-use data are provided in a mosaic of coarse resolution (for example, about 25 meters) orthorectified georeferenced tiles based on multispectral satellite images, for example, the Earth Observation for Sustainable Development of Forests (EOSD) forest cover map. The land-use data needs to have been acquired within a few years of (e.g. two years before or after) the acquisition of the DTM.

Referring to FIG. 1, there is depicted the calibration digital terrain model database (124), also called INPUT DATA 7. The calibration digital terrain model database (124) may include, for example, data representing calibration digital terrain model data (such as, representative LiDAR DTM samples or data taken from other sources as discussed above, and in the next paragraph). For instance, the calibration digital terrain model database (124) is derived from a remote sensing technology that measures distance by illuminating a target with a laser and analyzing the reflected light. It will be appreciated that the calibration digital terrain model database (124) is not just derived from LiDAR data (as described above and below in the next paragraph). The term LiDAR is an acronym for Light Ranging and Detection. LiDAR is popularly used as a technology used to make high resolution maps, with applications in geomatics, archaeology, geography, geology, geomorphology, seismology, forestry, remote sensing, atmospheric physics, airborne laser swath mapping (ALSM), laser altimetry, and contour mapping. The LiDAR data is acquired through remote sensing methods, such as aircraft that uses reflected laser to measure distance and thus elevation. To calibrate the landscape (or the ecosystem), and to find elevation error correction functions for satellite generated DTM, representative samples of LiDAR are needed or data from other sources of terrain data as discussed in the next paragraph. The samples may show variations in topography that are typical of that landscape (or an ecosystem). The data in the calibration digital terrain model database (124) covers a relatively smaller portion of the landscape (or the ecosystem). The representative calibration strips represents a very small representative sample. The representative calibration strips are not required for the whole landscape (or the ecosystem) or for any individual large territory.

By way of example, the calibration digital terrain model database (124) may include data representing (having) representative LiDAR strips (imagery data) or it may include photogrammetric digital surface model (DSM) from locations where the ground is bare because forest clear cuts from harvesting were conducted very recently before the imagery acquisition, or other areas with large areas of bare ground where DSM is available, so that the surface covered in the DSM is bare terrain and is thus representative of the terrain in these locations. The calibration digital terrain model database includes relatively higher detail (higher resolution) of digital terrain model data in comparison to the data contained in the digital terrain model database. The calibration digital terrain model database obtained from LiDAR is relatively more expensive to obtain versus the cost of obtaining the data associated with the digital terrain model database (116). It will be appreciated that the calibration digital terrain model database is not restricted to a LiDAR calibration strip. It is noted that the DSM referred to here is not to be confused with the digital surface model database (125). The calibration digital terrain model database (124) may be built (assembled) using a small portion of a DSM where the surface in the DSM is terrain and is not the canopy, and this can be determined, for example by looking at imagery and seeing bare ground in the imagery at the time the DSM was created.

Referring to FIG. 1, there is depicted the digital surface model database (125), also called INPUT DATA 8, representing (having or including) a digital surface model. A digital surface model (DSM) includes a set of computer files configured to describe the height and geographic coordinates of the surface of the Earth visible from the air (sky) or from space. This surface may or may not be the same elevation as the terrain. For example, the roof of a house is a surface which is not the same as the surface of the Earth or the terrain. This applies likewise for the height of the canopy of a forest. The DSM for the surface of a road at ground level will however be equal to the DTM. The DSM provides information about the elevation of pixels representing all the surfaces visible from the sky or from space, which may include land, water, and forest canopy. Generally, the DSM is described in pixels of a specific resolution for each DSM. A pixel is usually a square, the resolution describes the length of the side of the square. For example, a high resolution DSM may have one meter pixels, and a low resolution DSM may have about ten meter pixels. For each pixel the coordinates are provided or known. In one embodiment, the XYZ coordinates of the centre points of the pixels are known. In an embodiment, a DSM may be derived from the imagery data, such as a stereo digital surface model (stereo DSM) by stereo-matching and photogrammetric techniques. In another embodiment, a DSM may be derived from the interferometric processing of SAR image pairs acquired at radar frequencies in which little penetration into the forest canopy occurs (such as, radar X band, etc.).

Referring to FIG. 1, there is depicted the forest-feature output cell database (126), also called OUTPUT DATA 1, including (data representing) forest feature cells (hardwood, softwood, etc.). The forest-feature output cell database (126) includes, for example, data (a data file) representing or containing feature cells classified according to the rules (provided by the classification-rule database (120)) for a large territory or portion thereof. The forest-feature output cell database (126) includes data that describes the pixels that may be read by Geographic Information System software. For example, the data may include (and is not limited to): (A) XY coordinates of the center of each feature cell (for example, the UTM coordinates); (B) the feature cell type according to classification rules from classification-rule database (120) (for example, a hardwood feature cell, a softwood feature cell, a mixed-wood feature cell, and/or a no-timber feature cell (that is, a water feature cell or a bare-ground feature cell); and/or, (C) the dimensions and the shape of the feature cells (or type of pixel). UTM stands for "Universal Transverse Mercator".

Referring to FIG. 1, there is depicted the canopy height model pixel database (127). The canopy height model pixel database (127) includes (data representing) canopy heights in pixels. The canopy height model pixel database (127) includes, for example; the canopy height data in pixels and maps. The canopy height model pixel database (127) includes (stores) data representing (having) canopy heights on pixels. The canopy height model pixel database (127) includes data that can describes the output cells in a manner that can be read by a Geographic Information System (GIS) software. For example, the data may include (and is not limited to): (A) the XY coordinates of the center of each pixel (for example, UTM coordinates); (B) the average canopy height of the pixel (for example, in meters); and/or (C) the dimensions and shape of each pixel.

Referring to FIG. 1, there is depicted the dominant height canopy-height model output-cell attribute database (128), also called OUTPUT DATA 2, including canopy height data. The dominant height canopy-height model output-cell attribute database (128) includes; for example, the dominant canopy height data and maps. The dominant height canopy-height model output-cell attribute database (128) includes (stores) data representing (having) output cells stratified according to classified features and canopy heights. The dominant height canopy-height model output-cell attribute database (128) includes data that describes the output cells in a manner that can be read by Geographic Information System (GIS) software (and any equivalent thereof). For example, the data may include (and is not limited to): (A) the XY coordinates of the center of each output cell (for example, the UTM coordinates); (B) (the average canopy height of the dominant canopy stratum of the pixel (for example, in meters); (C) the canopy height class of the output cell (for example, short class, medium class or tall class, or a measured quantity); and/or, (E) the dimensions and shape of each cell.

Referring to FIG. 1, there is depicted the forest output-cell attribute database (130), also called OUTPUT DATA 3; including forest attributes. The forest output-cell attribute database (130) includes, for example, data representing forest attribute data and maps. The forest output-cell attribute database (130) includes data containing output cells stratified according to classified features and canopy heights. The file (a data file) contains information that describes the attributes in each of the output cells, in a manner that can be read by geographic information system software. For example; the data may include: (A) the XY coordinates of the center of each output cells (for example, the UTM coordinates); (B) the dimensions and shape of each output cells (for example, a square-shaped output cells having 20 meter sides); (C) the volume of merchantable timber in the output cells (for example; in cubic meters m3); and/or; (D) the basal area of merchantable timber in the output cells (for example in square meters, $m^2$).

Referring to FIG. 1, there is depicted the percent softwood basal area database (131), also called OUTPUT DATA 4, including percent softwood basal area. The percent softwood basal area database (131) includes a data file containing values representing the local percent softwood basal area of the forest within each cell (within each forest feature cell). The percent softwood basal area database (131) includes information that describes the cells in a manner that may be read by a geographic information system software. For example, the data includes in the percent softwood basal area database (131) may contain: (A) XY coordinates of the center of each cell (e.g. the UTM coordinates); (B) the dimensions and shape of each cell (e.g. square; 20 m sides); and (C) percent softwood basal area in the cell (in %).

Referring to FIG. 1, there is depicted the enhanced digital terrain model database (133), also called OUTPUT DATA 5, including (having or data representing) an enhanced digital terrain model. The enhanced digital terrain model database (133) includes a data file containing values representing the local elevation of the terrain (such as, bare earth) within each cell (that is, the forest feature cell). The enhanced digital terrain model database (133) includes information that describes the cells in a manner that can be read by the geographic information system software. For example, the data may contain: (A) XY coordinates of the center of each cell (e.g. UTM coordinates); (B) the dimensions (resolution) and shape of each cell (e.g. square, 20 m sides); and (C) terrain elevation in the cell (e.g. in meters). It will be appreciated that the resolution of the enhanced digital terrain model database (133) output cells may not necessarily be the same as the resolution as other output cells.

Referring to FIG. 1, there is depicted the error-correction database (524). The error-correction database (524) includes a file containing an error correction function for terrain curvature and an error correction function for land-use, and the associated parameters of these error correction functions. The error correction function database includes data that can be read by the forest-inventory management apparatus (100).

Referring to FIG. 1, there is depicted the strata database (814). The strata database (814) includes contains (includes) the set of selected estimation parameters and the coefficients to be applied to these parameters in the estimation equation for each stratum (for a large territory).

FIGS. 2A-1, 2A-2, 2A-3, 2A-4, 2A-5, 2A-6, 2A-7 and 2A-8 depict schematic representations of embodiments of the forest-inventory management program (110), also called the processor-executable programmed code, to be used by (to be deployed on) the server system (102) of FIG. 1.

Figures 1, 2A:
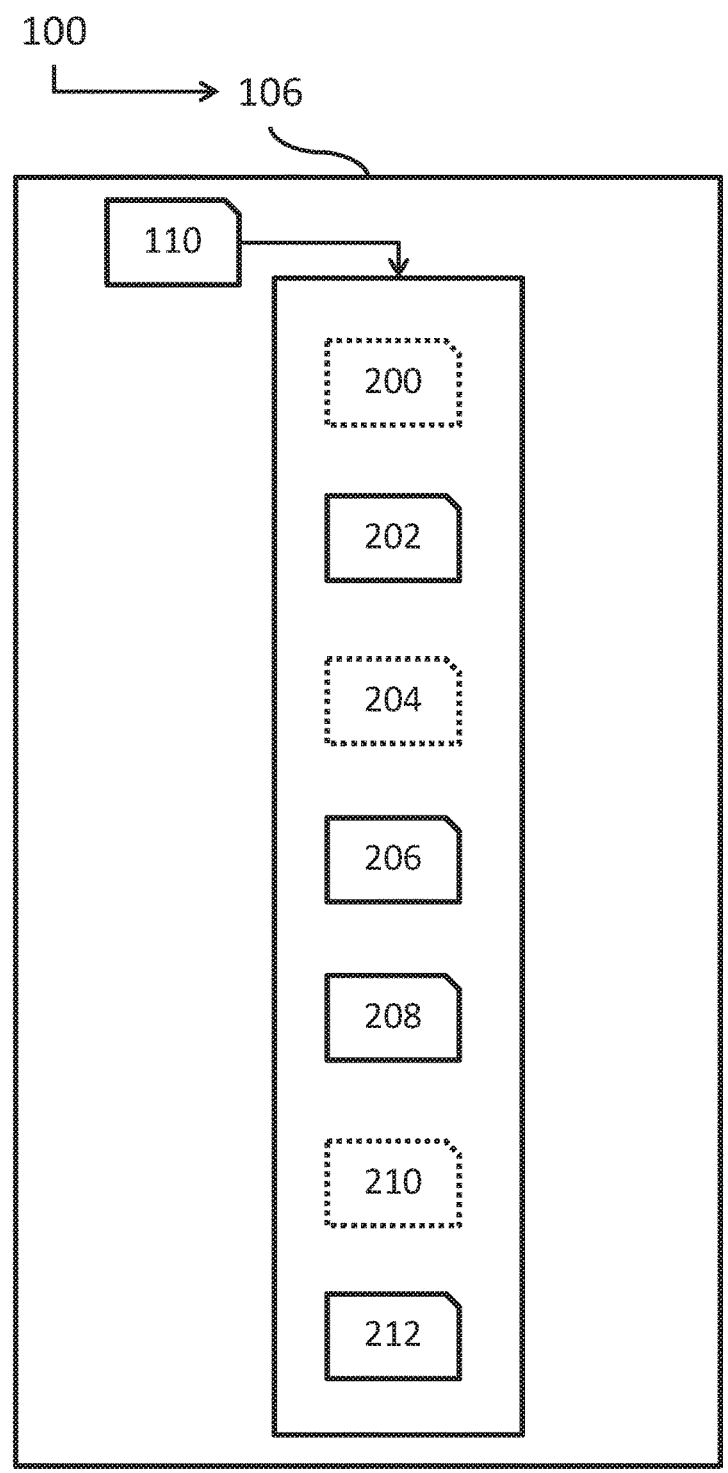

FIG. 2A-1 depicts a schematic representation of an embodiment of the forest-inventory management program (110) of FIG. 1. FIG. 2A-1 depicts an overview of the forest-inventory management program (110). The forest-inventory management program (110) is configured to extract forest features across a large territory using multispectral imagery. The forest-inventory management program (110) includes a first program (200), a second program (202), a third program (204), a fourth program (206), a fifth program (208), a sixth program (210), and a seventh program (212). The first program (200), the third program (204) and the sixth program (210) are classified as calibration-type programs. The second program (202), the fourth program (206), the fifth program (208) and the seventh program (212) are classified as production-type programs (production over a territory).

FIGS. 2A-2 to 2A-8 depict the relationships between those phases of the use of the forest-inventory management program (110) during which the parameters needed to obtain forest features are calibrated, and those in which the calibrated parameters are used to produce data and maps of the features and attributes. There are calibration phases for landscapes (or ecosystems) and for large territories. It will be appreciated that the programs depicted in FIG. 2A-1 may be operated in a non-linear manner. FIGS. 2A-2 to FIG. 2A-8 depict data flows showing the interrelationship between the phases of the use of the forest-inventory management program (110) during which the parameters needed to obtain forest features are calibrated, and those in which the calibrated parameters are used to produce data and maps of the features and attributes and terrain (it will be appreciated that the data for terrain may be an output product on its own). There are calibration phases for landscapes (or ecosystems) and for large territories. For example, for the case where the forest-inventory management program (110) is to be used to analyze a new landscape (or a new ecosystem) (such as, the Canadian shield), the processor assembly (104) of FIG. 1 executes the third program (204). The third program (204) provides executable code configured to urge the processor assembly (104) to calibrate the new landscape (or the new ecosystem); specifically, the third program 204 is configured to calibrate the error correction functions for DTM, before the new landscape (or the new ecosystem) is analyzed by the forest-inventory management program (110), and then stores the error correction function (on the server). It then stores the error correction function on the server system (102) depicted in FIG. 1.

Figures 2, 2A:
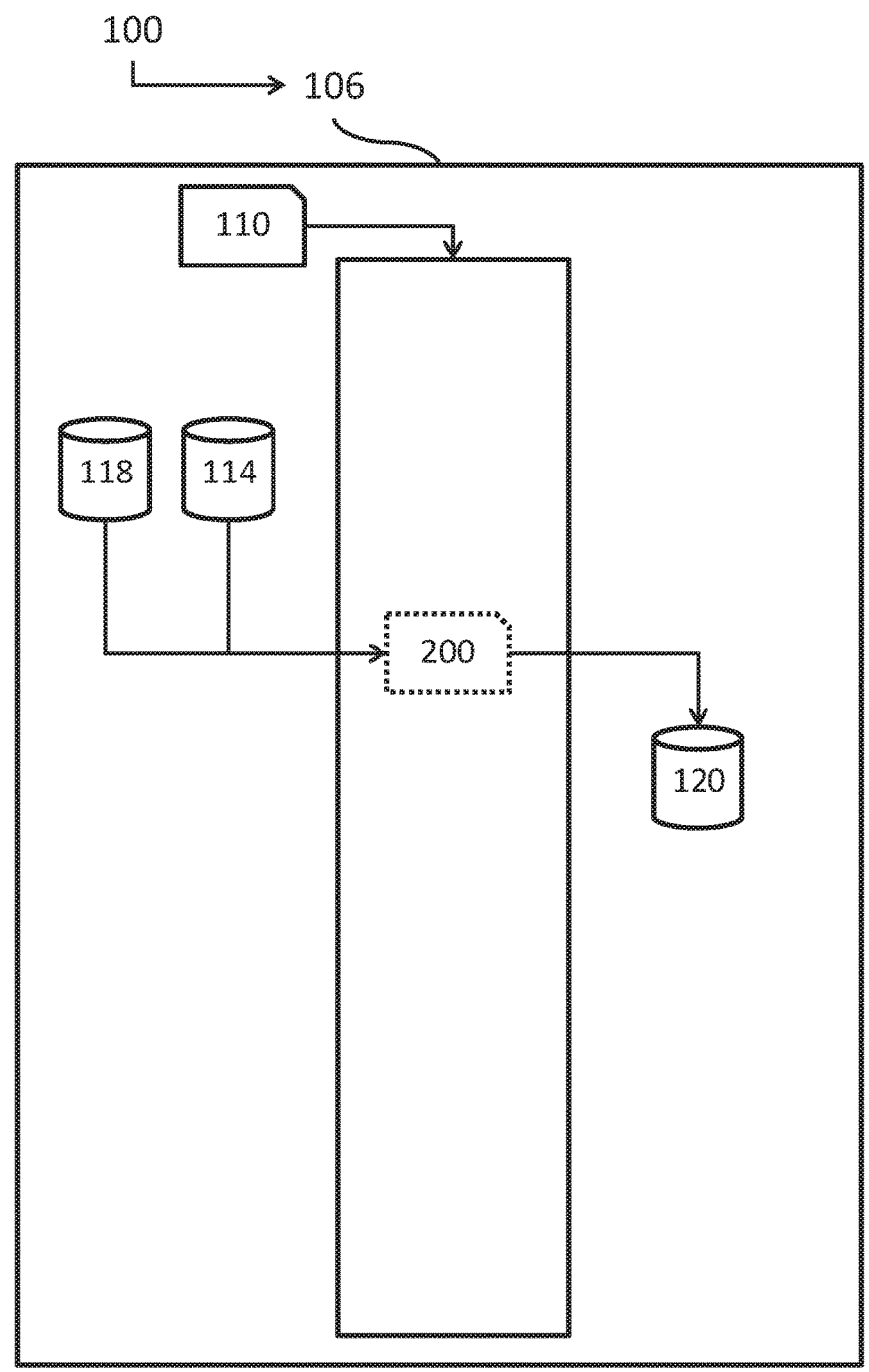

Referring to FIG. 2A-2, there is depicted an embodiment of the first program (200), which is a calibration-type program. The first program (200) is configured to read the data stored in the field-plot database (118) and the multispectral imagery mosaics database (114). The first program (200) is configured to write data to the classification-rule database (120).

The first program (200) is configured to retrieve: (A) data representing a calibration sample of the multispectral imagery mosaics of the same territory, and the data is retrievable from a multispectral imagery mosaics database (114), and (B) data representing field plot data with classes of forest features with geographic reference locations, and the data is retrievable from a field-plot database (118).

The first program (200) is also configured to compute data representing feature classification rules for classifying imagery pixels into feature cells representing a hardwood tree species group, a softwood tree species group, and other features on a large territory, based on: (A) estimation equations and arithmetic transformation of spectral bands (ATSBs); (B) multispectral imagery mosaics of the same territory; and (C) the data representing the field plot data with the classes of the forest features with the geographic reference locations.

The first program (200) is also configured to provide the data representing the feature classification rules for classifying imagery pixels into feature cells representing the hardwood tree species group, the softwood tree species group, and other features on a large territory, and the data is storable in the classification-rule database (120).

Figures 2, 2A, 3:
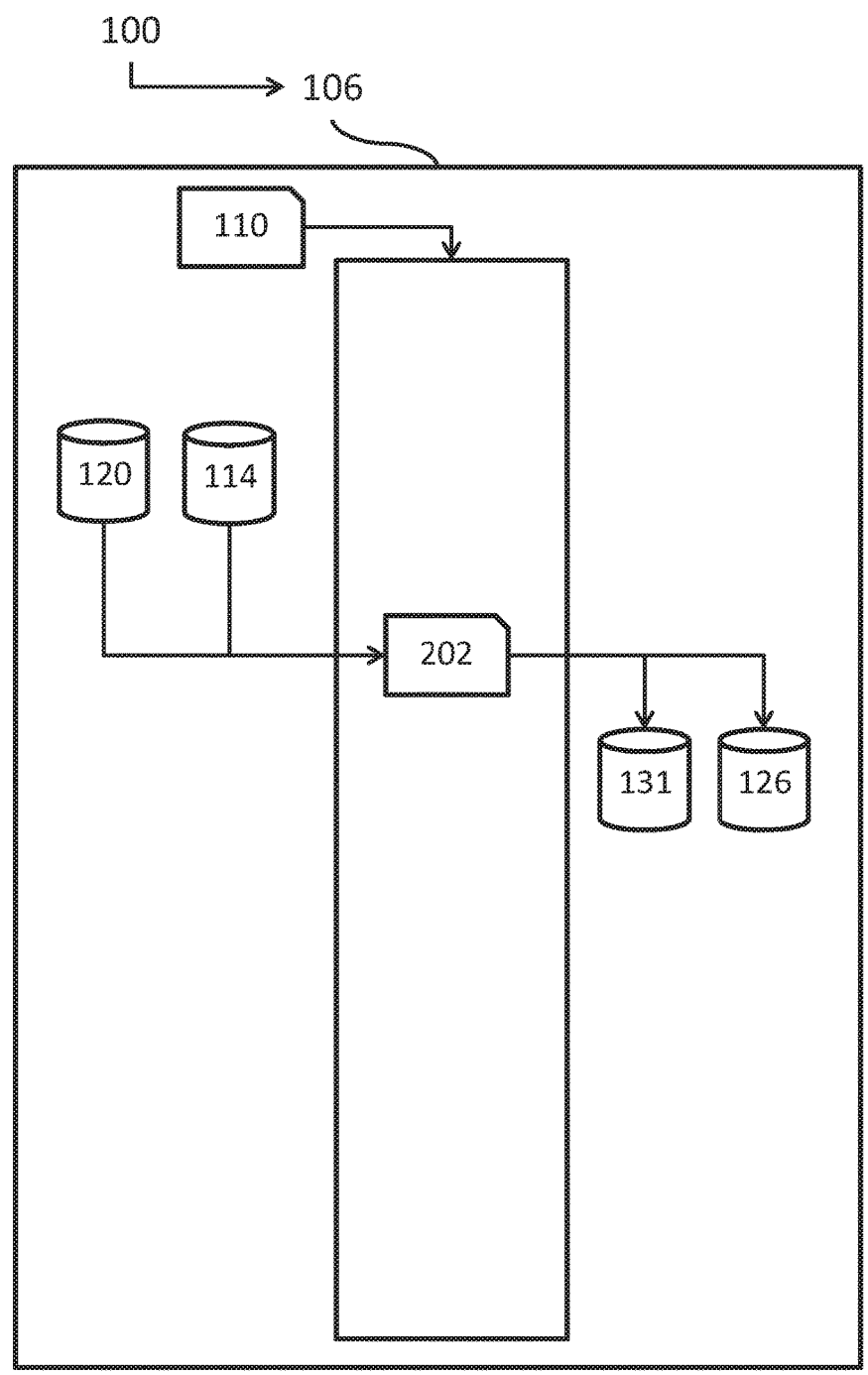
Figures 2, 2A, 3, 4:
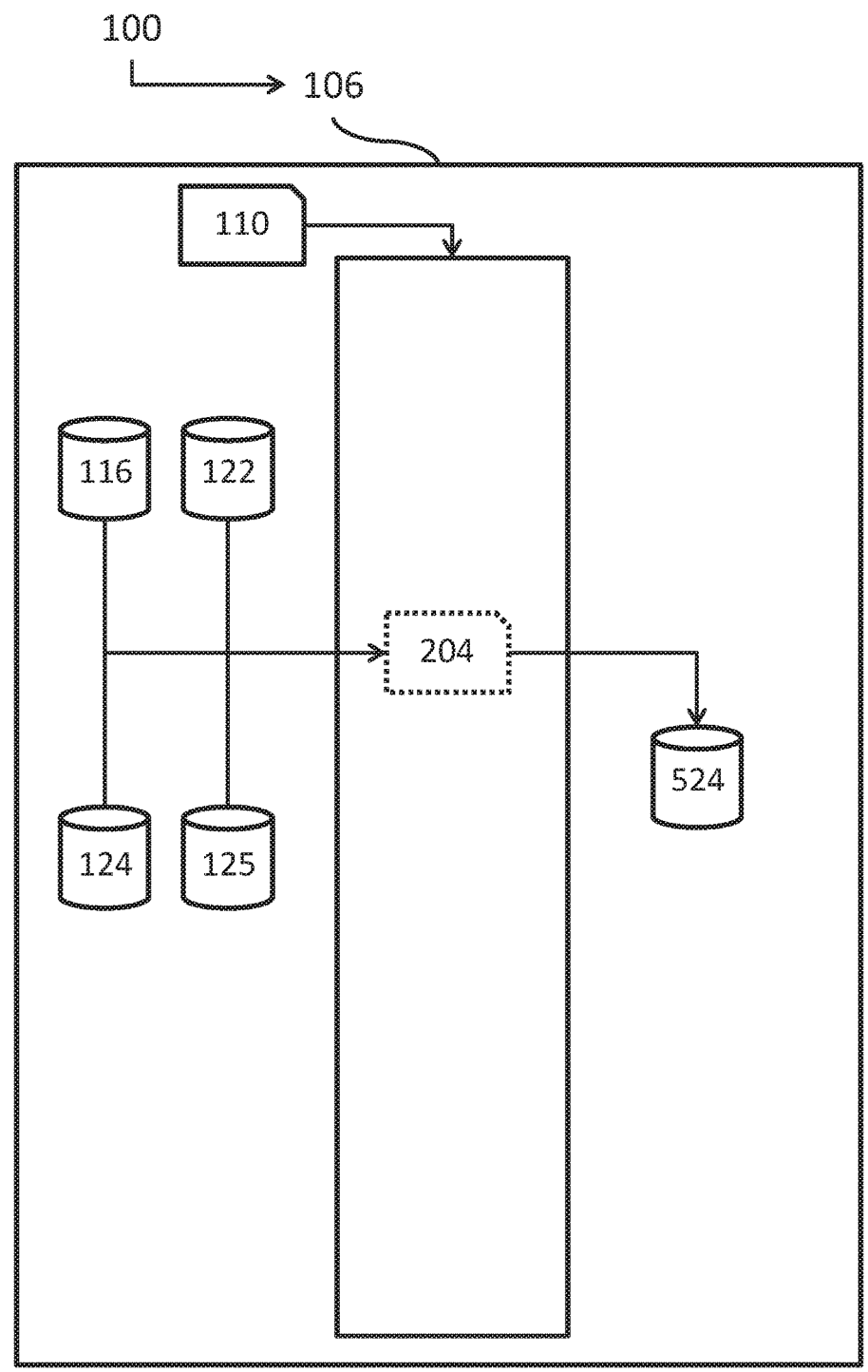
Figures 2, 2A, 3, 4, 5:
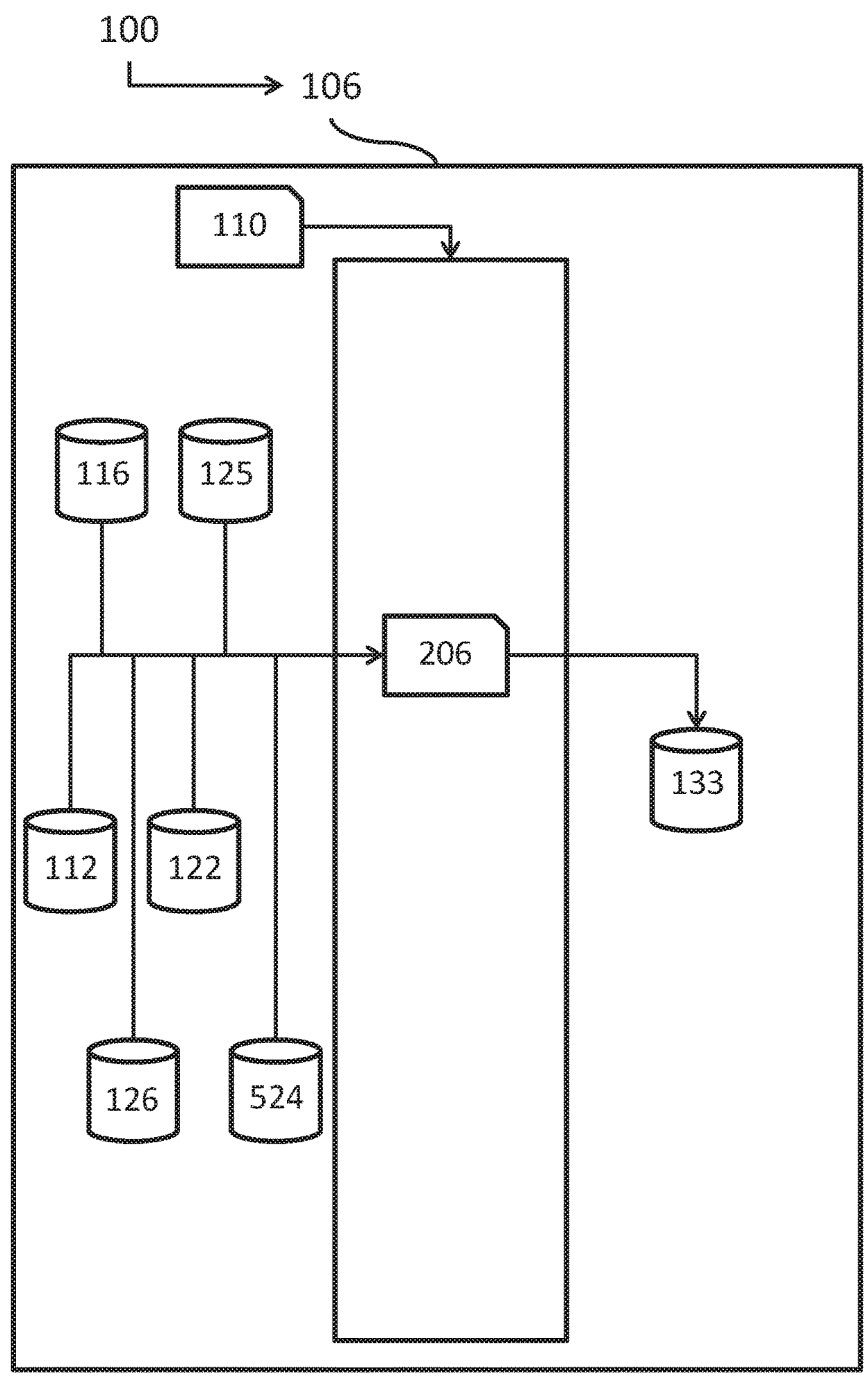
Figures 2, 2A, 3, 4, 5, 6:
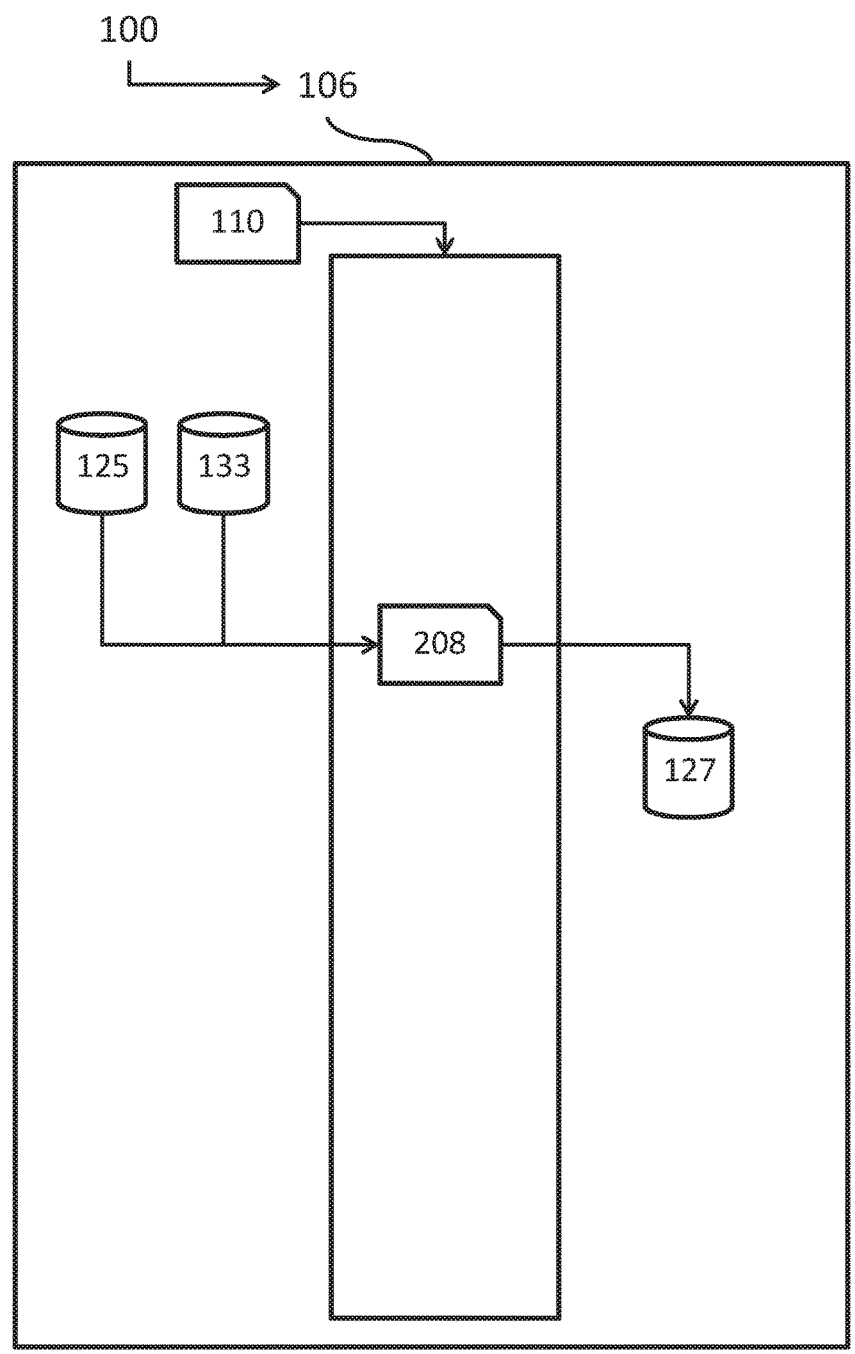
Figures 2, 2A, 3, 4, 5, 6, 7:
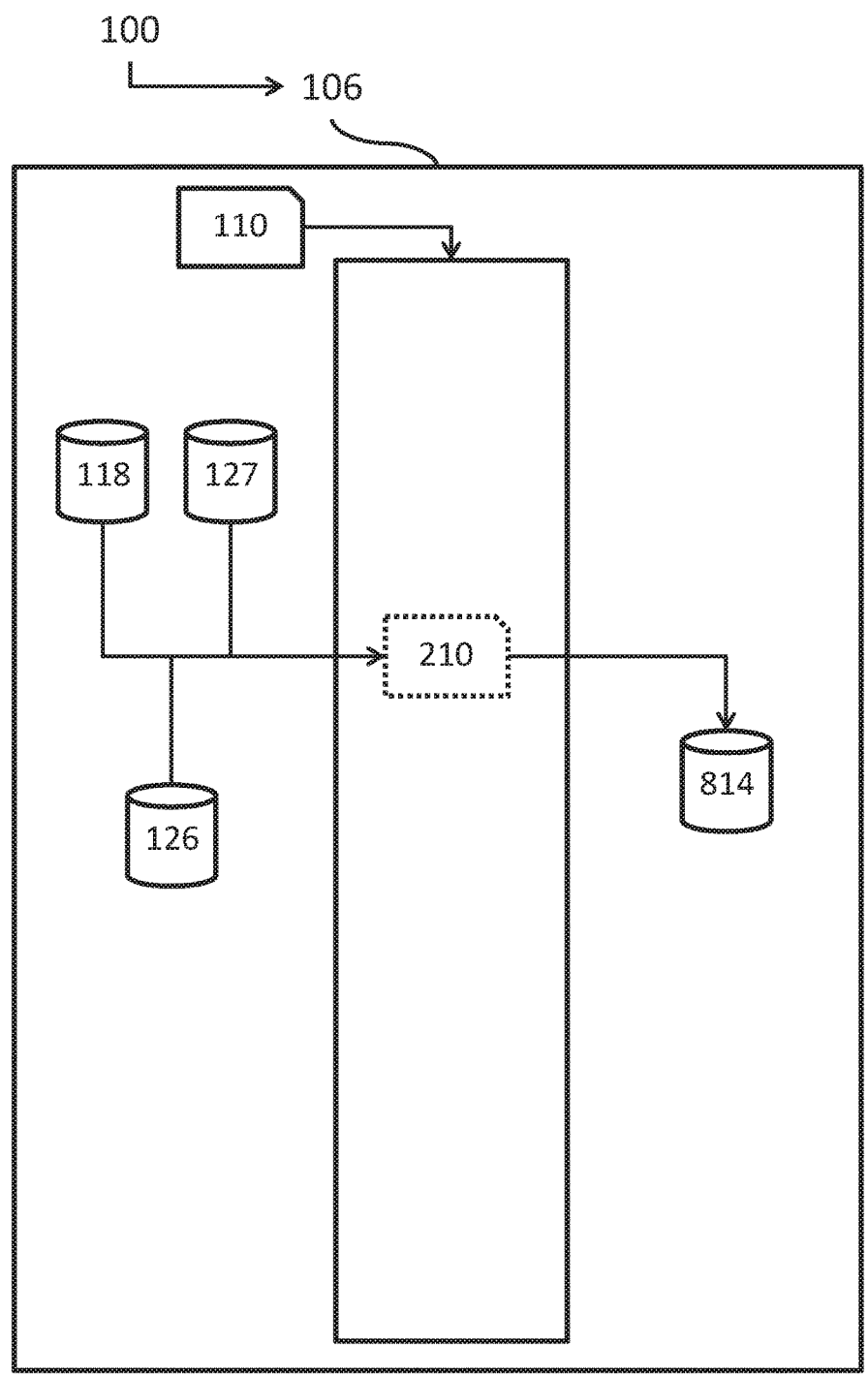
Figures 2, 2A, 3, 4, 5, 6, 7, 8:
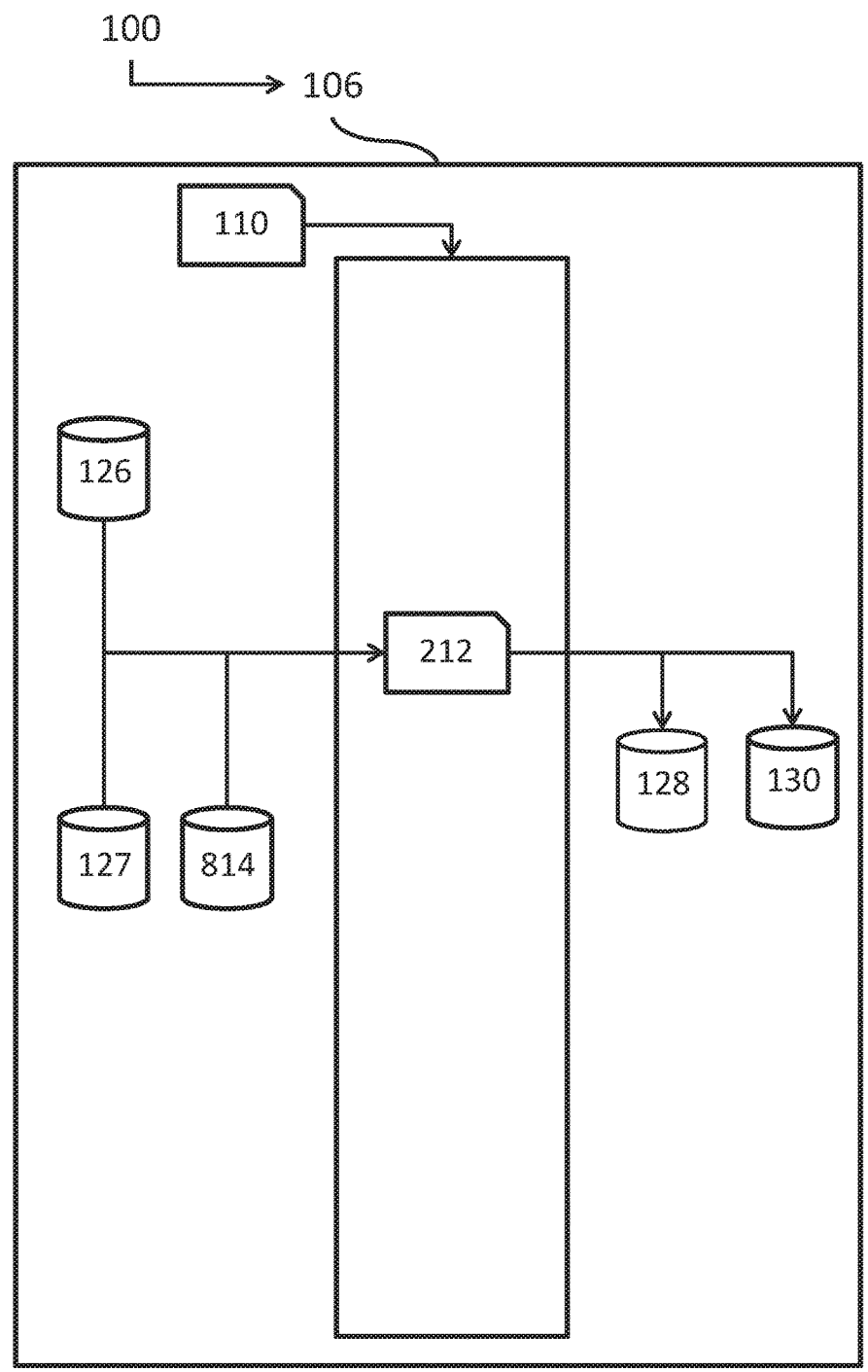

Referring to FIG. 2A-3, there is depicted an embodiment of the second program (202), which is a production-type program. The second program (202) is configured to read the data stored in the classification-rule database (120) and the multispectral imagery mosaics database (114). The second program (202) is configured to write data to the percent softwood basal area database (131) and to write data to the forest-feature output cell database (126).

In accordance with a first option, the second program (202) is configured to retrieve: (A) data representing multispectral imagery mosaics for large data files of the same territory, and the data is retrievable from a multispectral imagery mosaics database (114); and (B) data representing feature classification rules for classifying imagery pixels into feature cells representing hardwood/softwood tree species groups and other features on a large territory, and the data is retrievable from a classification-rule database (120).

In accordance with the first option, the second program (202) is also configured to compute data representing forest feature cells based on: (A) the data representing the feature classification rules for classifying imagery pixels into feature cells representing the hardwood tree species group, the softwood tree species group and other features on a large territory; and (B) the data representing the multispectral imagery mosaics for large data files of the same territory that was retrieved.

In accordance with the first option, the second program (202) is also configured to provide the data representing the forest feature cells, and the data is storable in a forest-feature output cell database (126).

In accordance with an embodiment, there is provided the forest-feature output cell database (126) including data representing forest feature cells, and the data was computed by a server system (102).

In accordance with an embodiment, there is provided the percent softwood basal area database (131) including data representing local percent softwood basal area of the forest within each forest feature cell, and the data was computed by the server system (102).

In accordance with an embodiment, there is provided the percent softwood basal area database (131) including data representing local percent softwood basal area of the forest within each forest feature cell, and the data was computed by the server system (102).

In accordance with a second option, the second program (202) is configured to retrieve: (A) data representing multispectral imagery mosaics for large data files of the same territory, and the data is retrievable from a multispectral imagery mosaics database (114); and (B) data representing feature classification rules for classifying imagery pixels into feature cells representing the hardwood tree species group, the softwood tree species group and other features on a large territory, the data is retrievable from a classification-rule database (120).

In accordance with the second option, the second program (202) is also configured to compute data representing local percent softwood basal area of the forest within each forest feature cell based on: (A) the data representing the feature classification rules for classifying imagery pixels into feature cells, and the data representing the estimation equations and ATSBs (the arithmetic transformation of spectral bands); and (B) the data representing the multispectral imagery mosaics for large data files of the same territory.

In accordance with the second option, the second program (202) is also configured to provide the data representing the local percent softwood basal area of the forest within each forest feature cell, and the data storable in a percent softwood basal area database (131).

Referring to FIG. 2A-4, there is depicted an embodiment of the third program (204), which is a calibration-type program. The third program (204) is configured to read the data stored in the digital terrain model database (116), the land-use database (122), the calibration digital terrain model database (124) and the digital surface model database (125). The third program (204) is configured to write data to an error-correction database (524) (the data includes error correction functions). The error-correction database (524) may be stored in the non-transitory machine-readable storage medium (106) depicted in FIG. 1.

The third program (204) is configured to retrieve: (A) data representing a digital terrain model, and the data being retrievable from a digital terrain model database (116); (B) data representing a digital surface model, and the data being retrievable from a digital surface model database (125); (C) data representing land-use, and the data being retrievable from a land-use database (122); and (D) data representing calibration digital terrain model data, and the data being retrievable from a calibration digital terrain model database (124).

The third program (204) is also configured to compute data representing error correction functions for terrain curvature and for land-use based (including for vegetation) on: (A) the data representing the digital terrain model; (B) the data representing the digital surface model; (C) the data representing the land-use; and (D) the data representing the calibration digital terrain model data.

The third program (204) is also configured to provide the data representing the error correction functions for terrain curvature and for land-use, and the data being storable in an error-correction database (524).

Referring to FIG. 2A-5, there is depicted an embodiment of the fourth program (206), which is a production-type program. The fourth program (206) is configured to read the data stored in the digital surface model database (125), the digital terrain model database (116), the spot-elevation database (112), the land-use database (122), the forest-feature output cell database (126) and the error-correction database (524). The error-correction database (524) includes the error correction functions. The fourth program (206) is configured to write data to the enhanced digital terrain model database (133).

The fourth program (206) is configured to retrieve: (A) data representing a digital terrain model, and the data is retrievable from a digital terrain model database (116); (B) data representing a digital surface model, and the data is retrievable from a digital surface model database (125); (C) data representing error correction functions for terrain curvature and for land-use, and the data is retrievable from an error-correction database (524); (D) data representing land-use, and the data is retrievable from a land-use database (122); (E) data representing spot elevation data for a large territory, and the data is retrievable from a spot-elevation database (112); (F) data representing forest feature cells, and the data is retrievable from a forest-feature output cell database (126).

The fourth program (206) is also configured to compute an enhanced digital terrain model containing values representing local elevation of terrain within the forest feature cell based on: (A) the data representing the digital terrain model; (B) the data representing the digital surface model; (C) the data representing error correction functions for terrain curvature and for the land-use; (D) the data representing land-use; (E) the data representing the spot elevation data for the large territory; and (F) the data representing forest feature cells.

The fourth program (206) is also configured to provide data representing (having) the enhanced digital terrain model containing values representing local elevation of terrain within the forest feature cell, and the data is storable in an enhanced digital terrain model database (133).

In accordance with an embodiment, there is provided the enhanced digital terrain model database (133) including data representing enhanced digital terrain model containing values representing local elevation of terrain within the forest feature cell, and the data was computed by the server system (102).

Referring to FIG. 2A-6, there is depicted an embodiment of the fifth program (208), which is a production-type program. The fifth program (208) is configured to read the data stored in the digital surface model database (125) and the enhanced digital terrain model database (133). The second program (202) is configured to write data to the canopy height model pixel database (127).

The fifth program (208) is configured to retrieve: (A) data representing a digital surface model, and the data is retrievable from a digital surface model database (125); and (B) data representing an enhanced digital terrain model, the data is retrievable from an enhanced digital terrain model database (133).

The fifth program (208) is also configured to compute (or provide) data representing (having) canopy height data pixel based on: (A) data representing a digital surface model, and the data is retrievable from a digital surface model database (125); and (B) data representing an enhanced digital terrain model, the data is retrievable from an enhanced digital terrain model database (133).

The fifth program (208) is also configured to provide the data representing the canopy height data pixel, and the data storable in a canopy height model pixel database (127).

In accordance with an embodiment, there is provided the canopy height model pixel database (127) including data representing canopy height pixel data, and the data was computed by a server system (102).

Referring to FIG. 2A-7, there is depicted an embodiment of the sixth program (210), which is a calibration-type program. The sixth program (210) is configured to read the data stored in the field-plot database (118), the data stored in the canopy height model pixel database (127), and the data stored in the forest-feature output cell database (126). The sixth program (210) is configured to write data to the strata database (814). The strata database (814) includes data representing (having) the estimation statistics and coefficients. The strata database (814) may be stored in the non-transitory machine-readable storage medium (106) depicted in FIG. 1.

The sixth program (210) is configured to retrieve: (A) data representing field plot data with classes of forest features with geographic reference locations, and the data being retrievable from a field-plot database (118); (B) data representing forest feature cells, and the data being storable in the forest-feature output cell database (126); and (C) data representing canopy height model pixel data, and the data being storable in a canopy height model pixel database (127).

The sixth program (210) is also configured to compute data representing estimation parameters and coefficients based on: (A) the data representing the field plot data with classes of forest features with the geographic reference locations; (B) the data representing the forest feature cells; and (C) the data representing the canopy height pixel data.

The sixth program (210) is also configured to provide data representing the estimation parameters and coefficients, and the data being storable in a strata database (814).

Referring to FIG. 2A-8, there is depicted an embodiment of the seventh program (212), which is a production-type program. The seventh program (212) is configured to read the data stored in the forest-feature output cell database (126), the canopy height model pixel database (127), and the strata database (814). The seventh program (212) is configured to write data to the forest output-cell attribute database (130) and to the dominant height canopy-height model output-cell attribute database (128).

The seventh program (212) is configured to retrieve: (A) data representing forest feature cells, and the data storable in a forest-feature output cell database (126); (B) data representing canopy height model pixel data, and the data storable in the canopy height model pixel database (127); and (C) data representing estimation parameters and coefficients, and the data storable in a strata database (814).

The seventh program (212) is also configured to compute data representing the forest attributes containing output cells stratified according to classified features and canopy heights based on: (A) the data representing the forest feature cells; (B) the data representing the canopy height pixel data, and (C) the data representing the estimation parameters and the coefficients.

The seventh program (212) is also configured to provide data representing the forest attributes containing output cells stratified according to classified features and canopy heights, and the data storable in a forest output-cell attribute database (130). The seventh program (212) is also configured to provide data representing the dominant canopy heights, containing output cells stratified according to classified features and canopy heights, and the data storable in the dominant height canopy-height model output-cell attribute database (128).

In accordance with an embodiment, there is provided the forest output-cell attribute database (130) including data representing forest attributes containing output cells stratified according to classified features and canopy heights, and the data was computed by the server system (102). In accordance with an embodiment, there is provided the dominant height canopy-height model output-cell attribute database (128) including data representing dominant canopy heights containing output cells stratified according to classified features and canopy heights, and the data was computed by the server system (102).

Figure 2B:
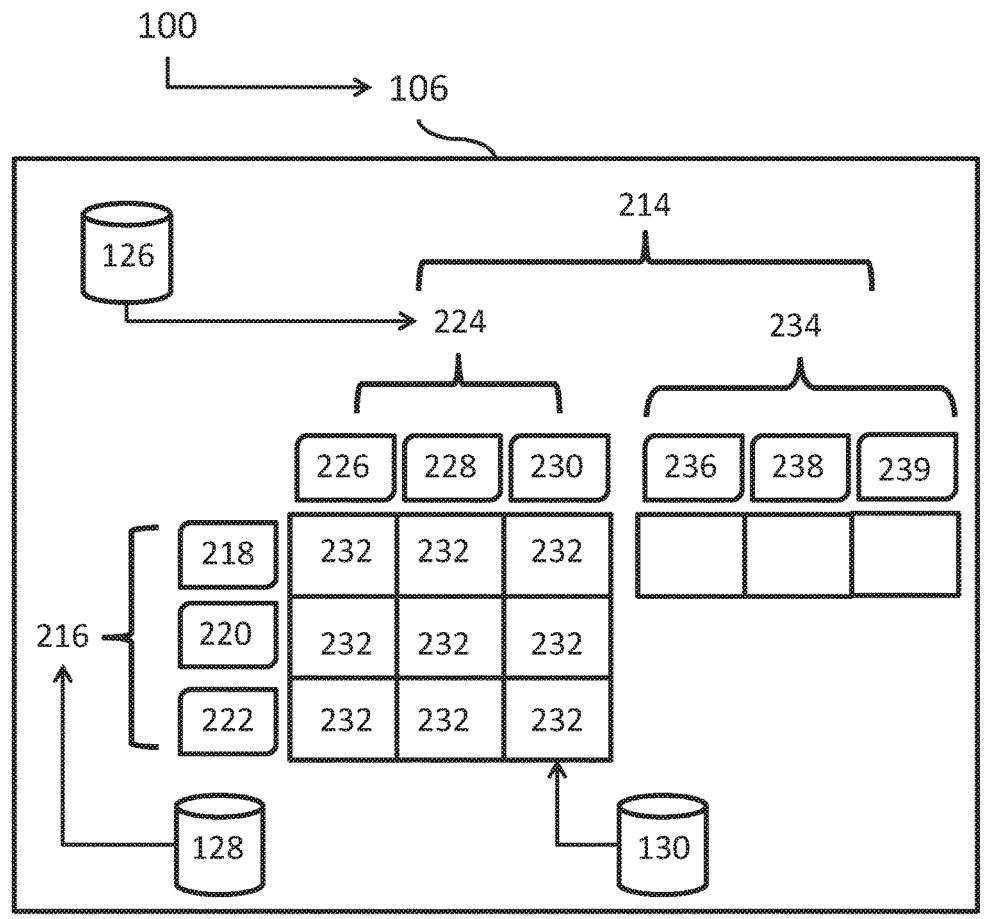
FIG. 2B (SHEET 10 OF 21 SHEETS) depicts an example of stratified data provided by the server system of FIG. 1, in accordance with an embodiment of the present invention.
Figure 2C:
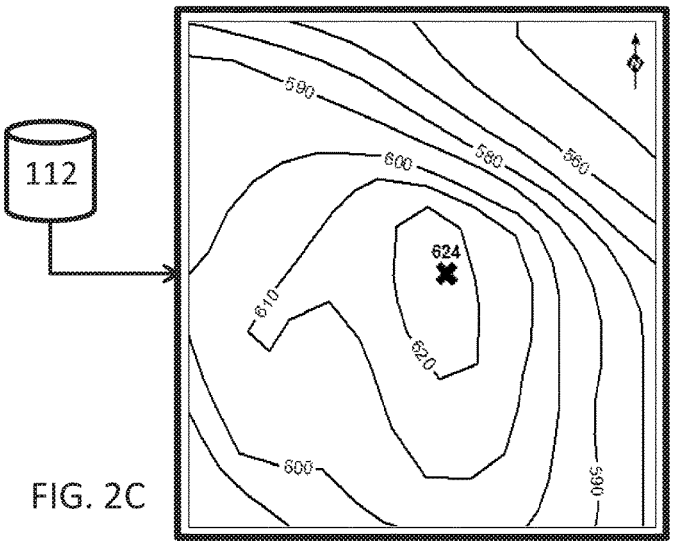
FIG. 2C (SHEET 10 OF 21 SHEETS) depicts a schematic example of a spot-elevation database used by the server system of FIG. 1, in accordance with an embodiment of the present invention.
Figure 3:
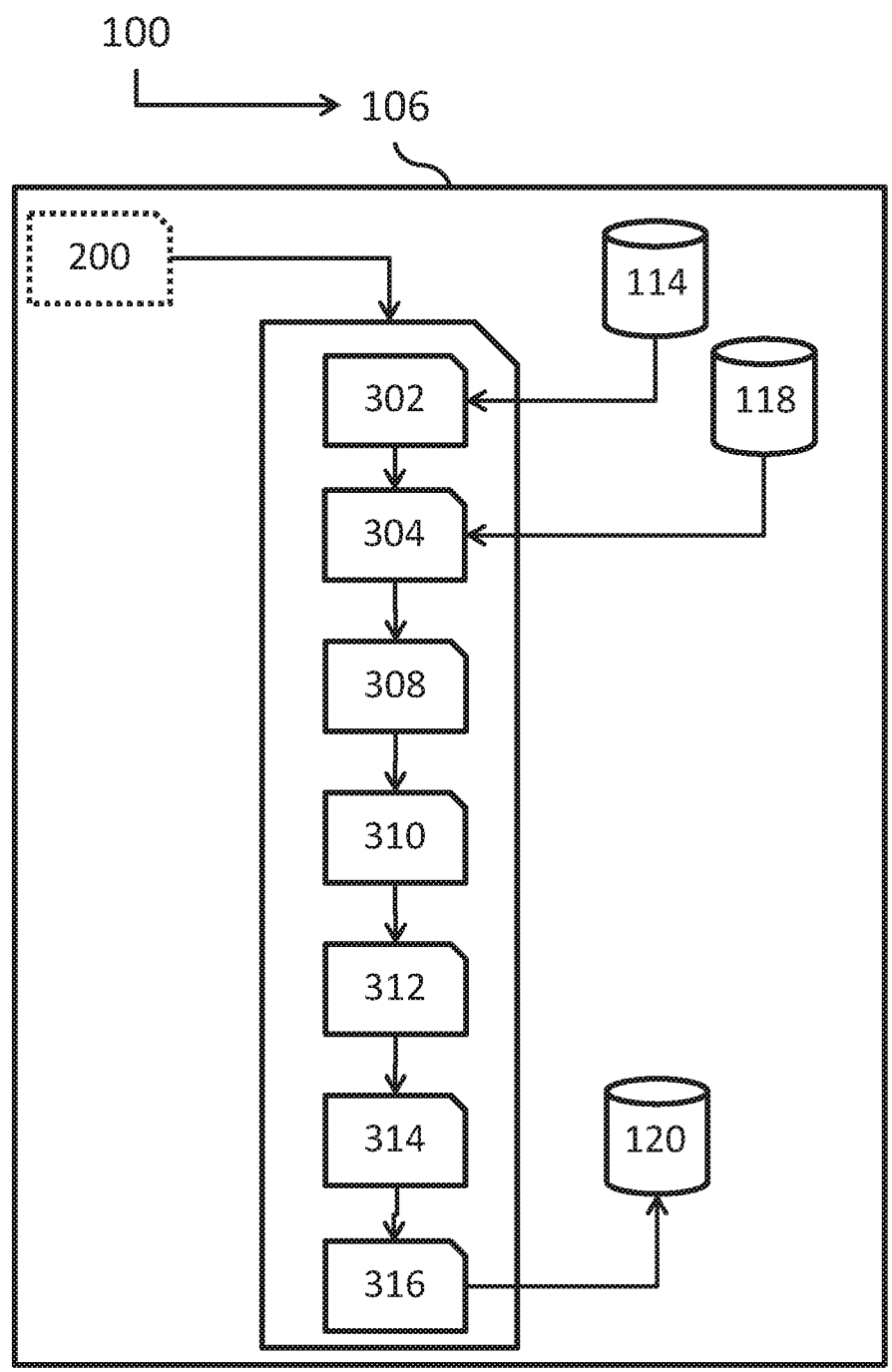
Figure 4:
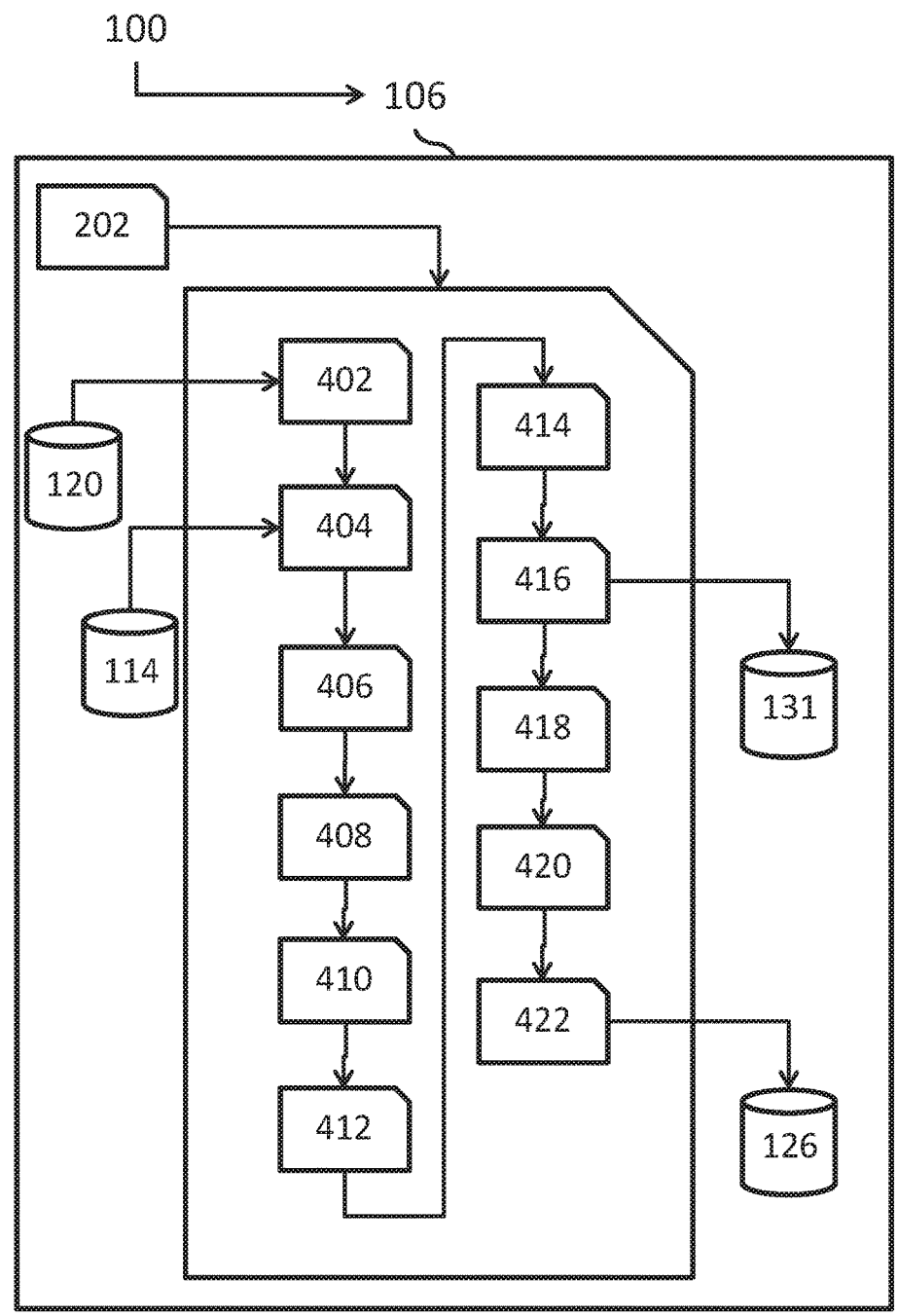
Figure 5:
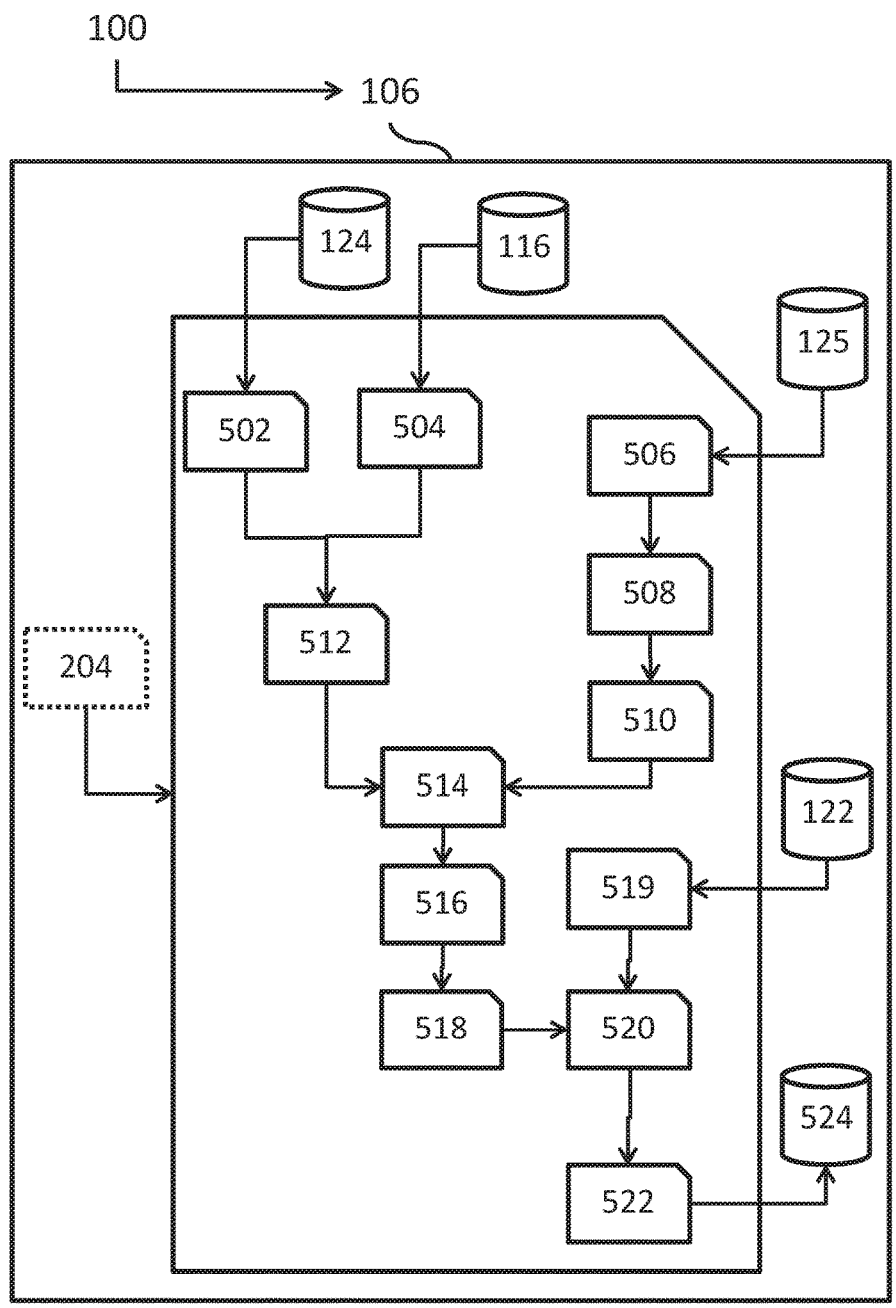
Figure 6:
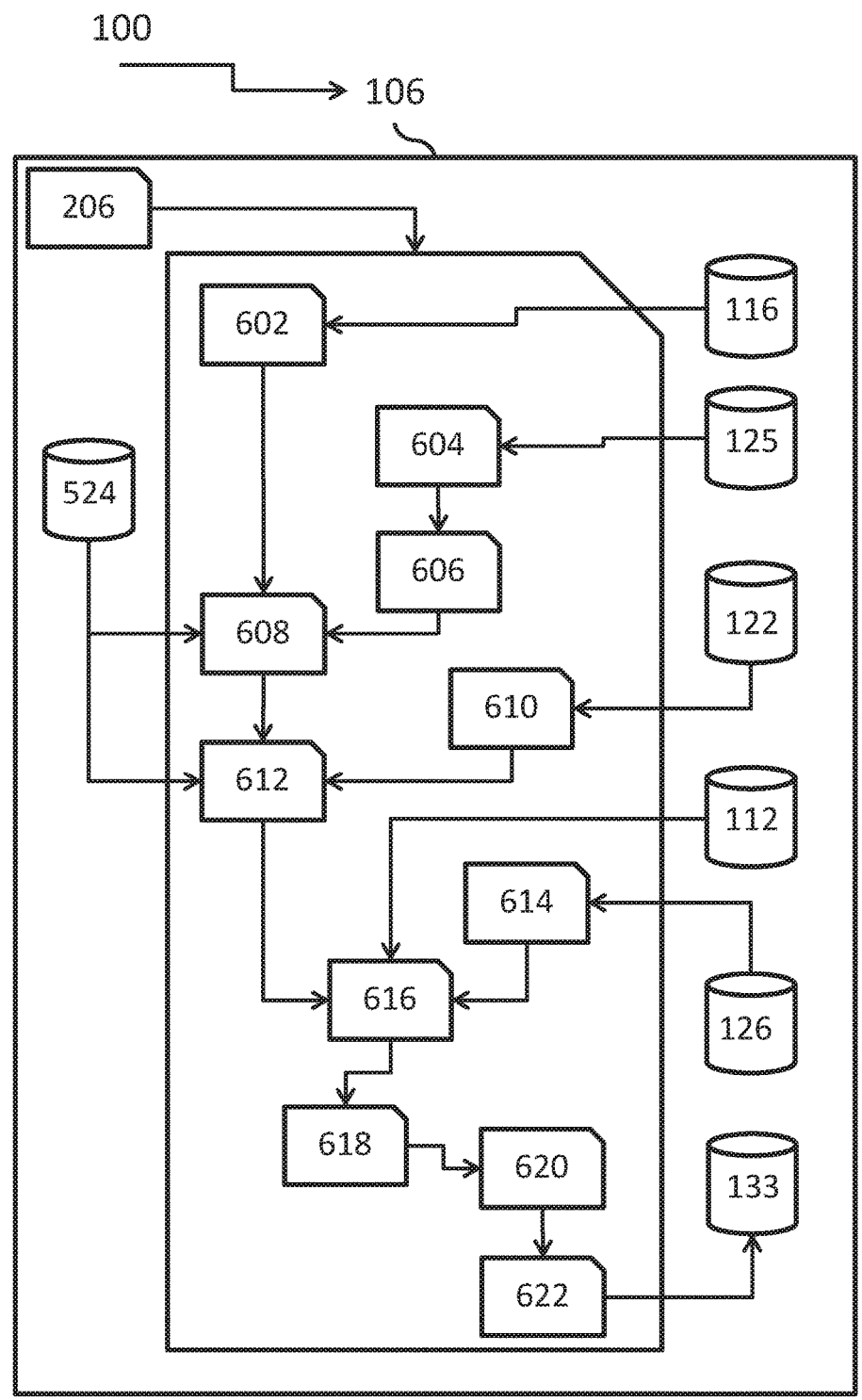
Figure 7:
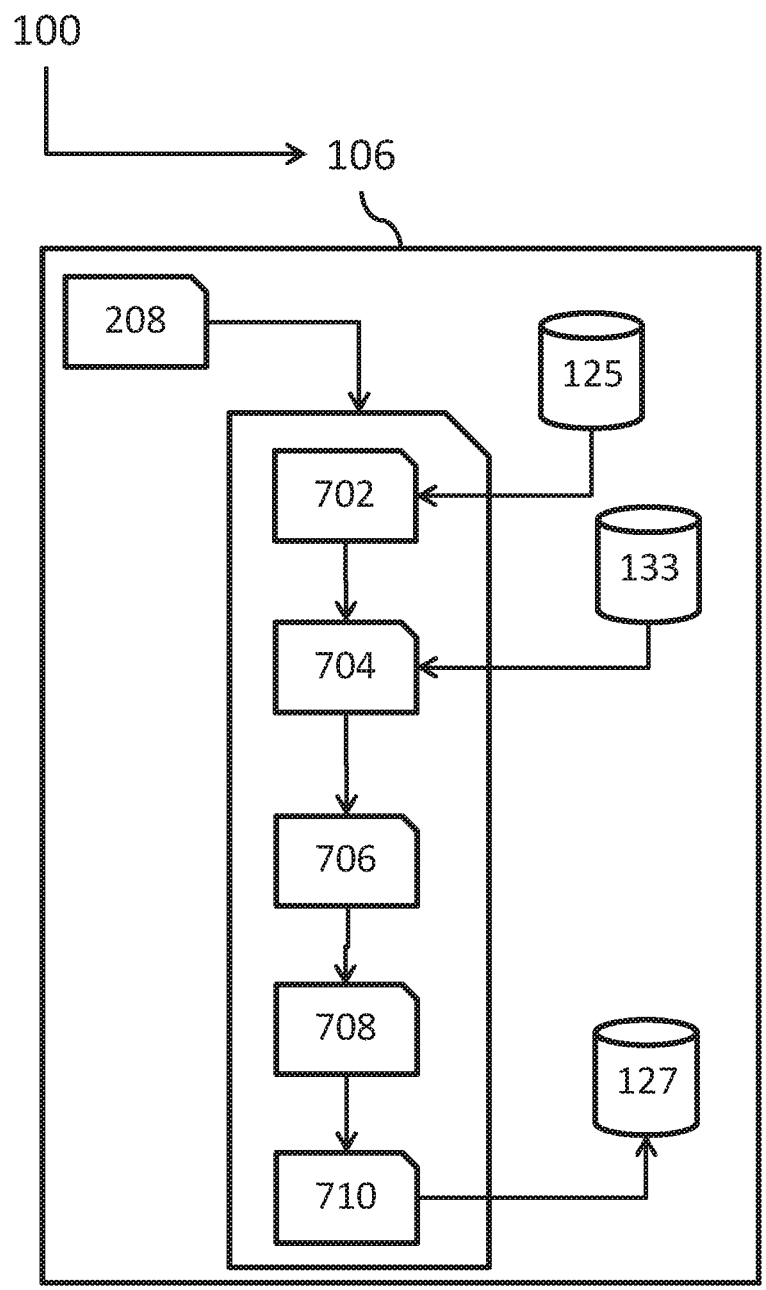
Figure 8:
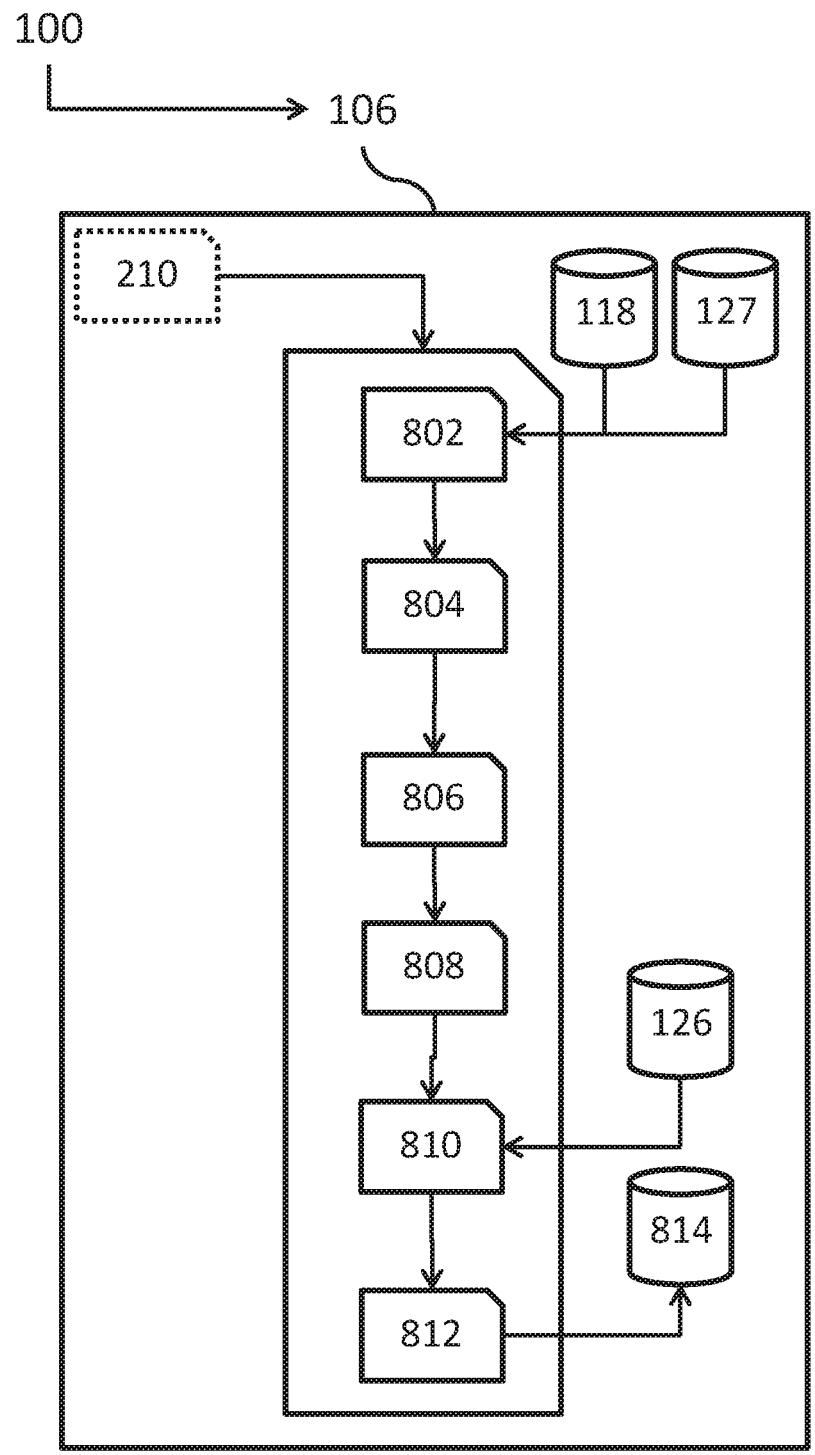

FIG. 2B depicts an example of data stratified by using the forest-inventory management program (110) of FIG. 1, FIG. 2A-1. The data represents the stratification of forest features. This shows in a general way how the forest-feature output cell database (126) and the dominant height canopy-height model output-cell attribute database (128) are combined to produce the forest output-cell attribute database (130) and the dominant height canopy-height model output-cell attribute database (128).

The forest-feature output cell database (126) contains what is called forest features. The forest features are identifiable and classified from the imagery. The canopy height model pixel database (127) contains information on the canopy height of the forest in the large territory. By cross-tabulating the forest-feature output cell database (126) and the canopy height model pixel database (127), a matrix is produced. The forest-inventory management program (110) then estimates attributes within the cells of the matrix. The estimates of the attributes over the large territory constitute the forest output-cell attribute database (130), and the estimates of the dominant canopy heights within the cells constitute the dominant height canopy-height model output-cell attribute database (128). For example, the forest-inventory management program (110) may apply equations to estimate attributes and dominant canopy heights for forest stands with tall softwood, short hardwood, etc.

A forest-feature trait (214) represents the classified forest features along the top horizontal section of the example. A canopy-height attribute (216) represents the canopy height along the side vertical section of the example. The canopy-height attribute (216) includes a short class (218), a medium class (220), and a tall class (222). A tree-species groupings feature (224) includes cross-classified features extending along the top horizontal section of the example. The tree-species groupings feature (224) includes a hardwood class (226), a mixed wood class (228), and a softwood class (230). Instances of an attribute (232) are populated in the matrix. The tree-species groupings feature (224) extends along the top section of the matrix, and the canopy-height attribute (216) extends along the vertical section of the matrix. An additional feature (234) is provided, and the additional feature (234) includes a bare-ground class (236), a water class (238), and may include additional classes in an embodiment depending on the classification rules. An additional class (239) is provided for the case where more than these two non-forest features (water and ground) are used (depending on the manner used for calibrating and classifying the features with the classification rules.

The forest-feature output cell database (126) (forest features) and the canopy height model pixel database (127) (canopy height) may be cross-classified to produce a matrix. The strata are the cells of the matrix. In this example, there are nine strata, with attributes in each stratum. The user may decide not to cross-classify all features and canopy heights. In one embodiment, for example, the user may decide to have a single stratum that covers all canopy height classes and all feature classes. In another embodiment, for example, the user may decide to have two canopy height classes and three tree-species groupings feature classes for a total of two times three which creates six strata. Within each cell of the matrix (for example, tall softwoods) equations estimate attributes of the forest of commercial or other interest. This is forest output-cell attribute database (130), and includes such outputs as the absolute basal area (basal area is the sum of the area of all the cross sections of the trees at breast height in an output cell), or volume of merchantable timber (for example, cubic meters). Equations also estimate the dominant height canopy-height model output-cell attribute database (128), which includes the height of the dominant stratum of trees (the dominant stratum is the top layer of trees in the canopy) for every cell. These can be estimated within an output cell (for example, a 400 square-meter output cell) or by summing across the entire large territory or portions thereof. Thus, for example, the volume of tall softwoods within an output cell, or within a defined polygon of land, or across the entire large territory, can be estimated.

FIG. 3 depicts the first program (200) of FIGS. 2A-1 and 2A-2, as a computer programming flowchart. FIG. 3 depicts a block diagram for calibrating the classification rules for hardwood features, softwood features, and other features (for example, terrain or water) across a large territory using ATSBs (the arithmetic transformation of spectral bands) from multispectral imagery (classify forest features). The first program (200) is configured to calibrate the hardwood estimation and the softwood estimation parameters. FIG. 3 depicts an embodiments of the first program (200) configured to calibrate the feature classification rules and estimation equations for percentage softwood basal area across a large territory using ATSBs from multispectral imagery.

In many instances (for example, U.S. Pat. No. 7,212,670 B1), a single image is used to identify tree species or other forest features. The reflected energy at given wavelengths for the features will be similar within the image, with some variation caused by illumination variations. The reflected energy at given wavelengths can be determined by comparing locations in the forest where the feature is known, by collecting information, for example, from forest sample plots. Over large territories, the airborne or space-borne imagery acquired in strips and subsequently orthorectified is segmented in adjacent tiles that form a "mosaic". The arrangement of tiles is similar to the arrangement of tiles on a floor. The image parts within each tile and across tiles may have been acquired in circumstances that can vary by a negligible amount, or that can vary significantly. This can have a corresponding effect on the properties of the light that is acquired in the images. For example, two adjacent tiles containing image parts taken moments apart under the same conditions may be very similar, thus the color of a certain similar object (such as the needles of a sunlit spruce tree) may be almost identical in the two tiles. If the imagery for two tiles is taken several days or weeks apart, the color of the similar object may be somewhat different. This means that the intensity (and recorded brightness) of the light at specific wavelengths emanating from the object may be different. This makes it difficult, if not impossible, to identify tree species or other features of the forest by using the absolute intensity values at specific wavelengths of the light as a signature across the entire large territory because the imagery is made up of many independent images subsequently stitched together and arbitrarily segmented into tiles. In a large territory of one million hectares, for example, there could be hundreds or even more than one thousand tiles or image parts, all acquired under different light conditions.

In many instances, as described in U.S. Pat. No. 7,212,670 (METHOD OF FEATURE IDENTIFICATION AND ANALYSIS; Inventor: ROUSSELLE et al.; Publication Date: 1 May 2007), which is incorporated herein by reference, a single image is used to identify tree species or other forest features. The recorded brightness at different wavelengths for the features may be similar within the image, with some variation for sun and shade. These brightnesses can be determined by comparing locations in the forest where the feature is known, by collecting information, for example, from forest sample plots.

Multispectral imagery contains pixels and data associated with each pixel for different bands. For example, the multispectral imagery may contain imagery from the following parts of the light spectrum: red, blue, green and infrared. Each of these is a band. For example, the band called "green" may cover the part of the spectrum from 510 nm±(plus or minus) 20 nm (nanometers).

By way of illustration, it is as if a black-and-white photograph were taken multiple simultaneous times of some object, with a different color filter used each time. The four photographs may be taken with red, blue, green and infrared filters. The light that passes through a filter is the light from the band associated with that filter. In each photograph, pixels are used to represent the object; the same pixels are used in the other photographs. In each of the four resulting images, the data captured for the images is a brightness value, typically called a Digital Number in image processing, for each pixel in the image. For each pixel, the imagery data contains a separate Digital Number for each filter. For example, a particular pixel may have the Digital Numbers [100], [25], [40], and [30] for the red, blue, green and infrared bands, respectively. The data in the multispectral image mosaics enables comparisons to be made of the relative brightness of different bands of light for a particular pixel.

The forest-inventory management program (110) is configured to extract ATSBs. The forest-inventory management program (110) is configured to classify forest features using ATSBs for features. Multispectral imagery provides embedded in the imagery in such a way that commercial imagery processing software can read information from several parts of the light spectrum (such as, red, blue, green, infrared and panchromatic). For the case where the idealized situation is considered, in which a patch of hardwood trees has a value of (100) in the infrared band, and 25 in the red band. A similar patch of hardwood tree in another tile (whose imagery was acquired in different conditions) has values of 40 in the infrared band and a value of 10 in the red band. When the ratio of infrared-to-red is calculated, 4.0 is obtained (computed) in both cases. This ratio would typically differ from the values of the infrared-to-red ratio for other features, such as softwood trees, which could (for example) have a ratio of 3.0. A band ratio is more stable than the absolute values for identifying features, and more usable for classifying features. Features may be classified using a number of different arithmetic transforms, such as ratios (e.g. infrared-to-red), ratios of sums or differences (e.g. infrared/(blue+green+red+infrared), etc.

In some instances the different conditions in which the imagery was acquired, such as summer and winter (and not limited to these two times of the year), is used to classify the features. In one embodiment, the well-known normalized difference vegetation index (NDVI=(Infrared−Red)/(Infrared+Red)), or a variant, such as the green NDVI (GNDVI=(Infrared−Green)/(Infrared+Green)), is calculated for each condition (e.g. summer and winter), and a new ATSB is computed by taking the difference between the two NDVIs and used for feature classification. This embodiment works particularly well for cold climate landscapes (or cold climate ecosystems).

Classification steps may include: (A) general classification is based on ATSBs; (B) for the forest class cells from step A, establish estimation equation of percentage softwood basal area using field plots; (C) develop rules to classify output-cells based on percentage of softwood basal area into pure hardwood, pure softwood, and mixed forest (rules include thresholds on percentage softwood basal area for each class); and (D) a final classification (that is, replace forest class cells by application of (C)).

The process described above is called extracting arithmetic transformation of spectral bands (ATSB). This process can be repeated with every update of the imagery, which enables users of the output data of the forest-inventory management program (110) (that is, the forest-inventory management program (110)) to update the information on the features of the large territory at the same frequency with which the imagery is updated.

In one embodiment of the forest-inventory management program (110), a large list of possible ATSBs (and their associated equation for the arithmetic transformation) is included, and each ATSB is identified by a number. Once the optimal ATSB for a large territory is identified, the ATSB can be referred to by its identity. This means the equation for the ATSB does not need to be stored and recorded to electronic media when the optimal ATSB is stored.

FIG. 3 depicts the first program (200) of FIG. 2A-1, as a computer programming flowchart. The first program (200) is an embodiment of instructions that may be configured to be executable by the forest-inventory management program (110) of FIG. 1 (using high level computer programming instructions). The first program (200) is configured to calibrate the classification rules and estimation equations for hardwood and softwood and other features (e.g. terrain or water) across a large territory using ATSBs from multispectral imagery.

Operational control is transferred from the first program (200) of FIG. 2A-1 to operation (302).

Operation (302) further includes a processing operation (to be executed by the forest-inventory management program (110) of FIG. 1), such as a receiving operation including receiving calibration sample of data for multispectral imagery mosaics for large territory from the multispectral imagery mosaics database (114) of FIG. 1; a sample of the multispectral imagery mosaics database (114) may be received (used) for calibration purposes. The sample size should be based on statistical sampling principles. Operational control is transferred to operation (304).

Operation (304) includes a processing operation, such as receiving data from forest field plots and store on storage medium, to be retrieved from the field-plot database (118) of FIG. 1. Specifically, the processing operation includes receiving data from forest field plots and storing on a storage medium. Operational control is transferred to operation (308).

Operation (308) includes a processing operation, such as extracting values from the imagery mosaic at field plots locations, and calculating the ATSBs. Precise geographic information for each plot is included in the plot data, for example, data that locates it to within one meter. The imagery mosaic values will be extracted for each field plot, and the ATSBs will be calculated using these values. The resulting ATSB values are stored in a table that associates them with the corresponding field plot data. Specifically, the processing operation includes extracting values from imagery at field plots locations and calculating ATSBs. It will be appreciated that when the calculation of an ATSB is based on two conditions, (e.g. summer and winter) it will be necessary to read the imagery mosaic values for each field plot for each condition. Operational control is transferred to operation (310).

Operation (310) includes a processing operation, such as identifying the optimal ATSBs, feature classification rules, and estimation equation for percentage softwood basal area. Supervised machine learning is a set of data mining techniques described in the public domain literature and available in a number of commercial and open source software applications. In this step a user will take the table produced in 308 for the large territory and export it to software with the ability to do machine learning (e.g. SAS, R, etc.). The machine learning software, with supervision from the user, will determine classification rules for features, and an estimation equation for percentage softwood basal area. The result of this step is classification rules and/or estimation equations than can be used in the production phase. Operational control is transferred to operation (312).

Operation (312) includes a processing operation, such as waiting for a human operator to review the outputs from the calibration operation; the human operator compares the outputs to sample plots and imagery. Adjustments may be made to the classification rules and equation parameters if necessary. It will be appreciated that Operation (310) and operation (312) may be repeated as required until a satisfactory result is obtained. Operational control is transferred to operation (314) once the operation (312) is completed.

Operation (314) includes a processing operation, such as waiting for the human operator to set the thresholds used to assign one of the following categories to forest cells: pure hardwood, pure softwood, mixed forest by applying these thresholds to the values of percentage of softwood basal area. These thresholds are elements of the classification rules. Operational control is transferred to operation (316) once the operation (314) is completed.

Operation (316) includes a processing operation, such as storing the identity of the optimal ATSBs, classification rules and/or the estimation equations in a format readable by the forest-inventory management program (110) so that they can be used in the production phase (in the classification-rule database (120) of FIG. 1.) Operational control is passed to forest-inventory management program (110) of FIG. 2A-1.

FIG. 4 depicts the second program (202) of FIG. 2A-1, as a computer programming flowchart. The second program (202) is performed for producing the forest-feature output cell database (126) including hardwood, softwood, mixedwood feature output cells, and the percent softwood basal area database (131). FIG. 4 depicts a block diagram for producing classified forest features across a large territory using arithmetic transformations of spectral bands from multispectral imagery (ATSB). The second program (202) is configured to produce the forest-feature data. The forest-feature data includes hardwood data, the softwood data, and/or other data and/or maps. The second program (202) is an embodiment of instructions that may be configured to be executable by the forest-inventory management program (110) of FIG. 1 (using high level computer programming instructions). In general terms, the second program (202) is configured to instruct the forest-inventory management program (110) of FIG. 1 to produce classified forest features and percent softwood basal area.

The second program (202) is configured to produce classified forest features and percent softwood basal area across a large territory using ATSBs from multispectral imagery.

Operational control is transferred from the second program (202) of FIG. 2A-1 to operation (402).

Operation (402) includes a processing operation, including retrieving (reading) the results from the classification-rule database (120) (also called the INPUT DATA 5). The results include the calibration (that is, the identification of the optimal ATSBs, classification rules and/or estimation equations). It will be appreciated that the results (data) from the classification-rule database (120) is used in the production phase. Operational control is passed over to operation (404).

Operation (404) includes a processing operation, including reading (retrieving) the imagery mosaics (data) from the multispectral imagery mosaics database (114). Operational control is passed over to operation (406).

Operation (406) includes a processing operation, including calculating the ATSBs from the imagery mosaic across the large territory for each pixel. Operational control is passed over to operation (408). It will be appreciated that when the calculation of an ATSB is based on two conditions, (e.g. summer and winter) it will be necessary to read an imagery mosaic for each condition to perform the calculation.

Operation (408) includes a processing operation, including aggregating or splitting the ATSB pixels into cells. Operational control is passed over to operation (410).

Operation (410) includes a processing operation, including storing (writing) the ATSB for each cell across the large territory. Operational control is passed over to operation (412).

Operation (412) includes a processing operation, including performing perform the general classification of all the cells on the large territory using the rules from the classification-rule database (120) (the INPUT DATA 5) and the ATSBs. Operational control is passed over to operation (414).

Operation (414) includes a processing operation, including calculating the percentage softwood basal area for the cells classified as "forest" by applying the equations of the classification-rule database (120) (INPUT DATA 5) to the ATSBs. Operational control is passed over to operation (416).

Operation (416) includes a processing operation, including storing (writing) the percentage softwood basal area of all the cells on the large territory (the data) in the percent softwood basal area database (131) (also called the OUTPUT DATA 4). Operational control is passed over to operation (418).

Operation 418 includes a processing operation, including applying the thresholds in the classification-rule database (120) used to assign the forest cells to one of the following classes to the forest cells (such as, pure hardwood, pure softwood, mixed forest, etc.) (also called the INPUT DATA 5). Operational control is passed over to operation (420).

Operation (420) includes a processing operation, including updating (writing) the class of the cells classified as "forest" by one of the three (or more) categories of operation (414). Operational control is passed over to operation (422).

Operation (422) includes a processing operation, including storing (writing) the feature classification to the forest feature classification located in the forest-feature output cell database (126) (also called the OUTPUT DATA 1). Operational control is passed to forest-inventory management program (110) of FIG. 2A-1.

FIG. 5 depicts the third program (204) of FIG. 2A-1, as a computer programming flowchart. FIG. 5 depicts a block diagram for finding elevation error correction functions (for the DTM) to reduce elevation errors in a digital terrain model by using the calibration digital terrain model database (124) and the land-use database (122) (such as, the public land-use database). The third program (204) is configured to reduce elevation errors in a digital terrain model by using the calibration digital terrain model database (124). The third program (204) is configured to calibrate error correction functions for the DTM. The third program (204) is configured to provide a calibration phase for the landscape (or the ecosystem).

To determine the height of trees, the following values are determined: value (A) which is the elevation of the top of the canopy of the forest (canopy surface (or canopy height model (CHM)); and, value (B) which is the elevation of the terrain (or ground (or digital terrain model (DTM)) under the trees. The height of the forest canopy is the difference: value (A) minus value (B). Tree height is very valuable information (attribute) for timber companies. In combination with other information such as tree diameter, the timber volume of the trees can be estimated. It is true that tree volume may be estimated if the tree diameter and the tree height are known factors; however, in accordance with an option, the forest-inventory management program (110) does not estimate tree volume in that manner. The forest-inventory management program (110) is configured to estimate tree volume by performing regressions on sample plots where [Y]=f[Xi]. The height and timber volume are attributes of great interest to timber companies that harvest timber from forests.

The particular challenge in determining these attributes from multispectral stereo imagery is that the DTM is unknown. This is not the case, for example, with forest attribute data acquired through airborne LiDAR remote sensing. LiDAR provides both the DTM and the DSM, and other elevations in between, such as the heights of branches and leaves of trees. It is for this reason that the Ontario Forest Research Institute states in the aforesaid document referenced above at paragraph [00010]; "it is difficult to interpret tree height with ADS-40 images alone, and it is nearly impossible to accurately estimate forest structure and volume." The ADS-40 is an example of an instrument assembly configured to acquire aerial multispectral imagery.

In accordance with an option of the present invention, the forest-inventory management apparatus (100) may overcome this challenge by using other sources of the DTM than that provided in the multispectral imagery. The economic advantage of this is that LiDAR is very expensive data to acquire in comparison with multispectral imagery or may not be available for some geographic areas. It is also sometimes acquired by private interests for their own purposes and they do not make the data available to others (at any cost).

Usage is made of the DTM from InSAR (interferometric synthetic aperture radar) satellite missions. The resolution of the DTM is improved through a sequence of processes to create an enhanced DTM. This DTM is generally of lower resolution than what would be desired to estimate forest features: for example, the European Space Agency provides a DTM with a 90 meter resolution and NASA provides a DTM with a 30-meter resolution or a 90-meter resolution. These processes improve the resolution sufficiently that can be used to obtain a CHM. It will be appreciated that the DTM may be derived from (comes from) InSAR, and this does not limit the embodiment, and that the apparatus (100) is configured to enhance the DTM through the sequence of processes.

Elevation errors in lower resolution InSAR (for example, 90 meters) DTMs may be caused by the topographic variations being blurred or by variable InSAR signal penetration through vegetation. This blurring may be resolved by the following operations: (A) extract the pixel centers and elevations from the DTM to create point elevations, and apply spatial interpolation to these extracted pixel centers to create a higher resolution DTM (for example, five meters); (B) calculate the local terrain curvature from the digital surface model database (125), in which "curvature" of the surface is defined as the local change in terrain slope and is used to determine the level of convexity and/or concavity of the terrain shape; (C) in areas where terrain curvature is significant, apply an elevation correction that is proportional to terrain curvature (for example, convex topographical features may see their elevation increased while concave locations see their elevation decreased); (D) using a digital map of land cover taken within a reasonable time of the DTM (for example, the Canadian EOSD Landsat land cover map created in the year 2000, i.e. the same year as the SRTM mission or within a short period of time around the SRTM mission); and, (E) remove the elevation bias according to land-use type using the land-use elevation error correction function, based on land-use. For example, bare areas keep their original elevation, dense coniferous area entail an increase in the DTM elevations, etc. It will be appreciated that the Canadian EOSD Landsat land cover map is an example (embodiment) of the SRTM data.

Elevation errors in lower resolution InSAR (for example, 90 meters) DTMs may be caused by the topographic variations being blurred or by variable InSAR signal penetration through vegetation. To resolve the blurring and enhance the DTM for a landscape (an ecosystem) (and any equivalent thereof), two elevation error correction functions are needed. These error correction functions apply to a landscape (or an ecosystem). It will be appreciated that the process is not limited to using the SRTM data.

The first is a continuous function to correct the elevation errors due to terrain curvature. The second is a discrete function to correct the elevation bias respectively caused by each vegetation and land-use type. To calibrate the two functions, a calculation is made of the elevation error contained in digital terrain model database (116) (such as the SRTM DTM) using the calibration digital terrain model database (124) as a reference. The differences in elevation between the digital terrain model database (116) and the calibration digital terrain model database (124) are considered to be errors in the digital terrain model database (116). Error calculations may be done within a landscape (or an ecosystem) having a topography and vegetation types similar to those of the region for which DTM enhancement may be performed.

The following describes the elevation error correction function for terrain curvature: local terrain curvature (e.g. local change of slope caused by, say, hill tops or valley bottoms) is calculated on a high resolution DSM (such as those extracted by stereomatching from the multispectral image mosaics). The curvature of the digital surface model database (125) surface (measured locally over square windows of the DSM having a dimension approximately equivalent to that of the DTM, i.e. 90 m×90 m windows in the case of the enhancement of a SRTM DTM), even if the surface is vegetated, is highly equivalent to the curvature of the underlying terrain, even though the elevations are not the same. The DSMs described in this disclosure contain more curvature information than in the low resolution DTM. All surface elements are included in the DSM for this calculation (e.g. tall vegetation, bare ground etc.). These high resolution DSM should resampled to a lower resolution (for example, five meters) and smoothed (e.g. with a moving average filter) in order to attenuate the fine curvatures caused by non-terrain elements. Terrain curvature correction should only be applied in areas where curvature is significant (medium or high). For these areas, elevation errors are regressed against terrain curvature. From this regression, a function predicting the elevation error from terrain curvature is obtained.

An error correction function for terrain curvature is found through regression of the elevation error and the terrain curvature. For example, in one landscape (or in one ecosystem), the following regression equation for the error correction function for terrain curvature may be used:

$$[Y]=0.113[X]+3.645 R^2=0.56$$

where [Y] is the elevation error, and [X] is the terrain curvature locally in windows extracted from the DSM. When the DSM is convex the terrain curvature is negative, and when it is concave the terrain curvature is positive. $R^2$ (R-squared) is a measure of association typically used to characterize regression equations, and normally called the coefficient of determination.

The following describes the elevation error correction function for land-use: before the bias from land-use type is corrected, the terrain curvature errors must be removed. The above regression function is therefore applied to the digital terrain model database (116) in that portion that overlaps the calibration digital terrain model database (124). After this, the average difference between the curvature-corrected instance of the digital terrain model database (116) in that portion that overlaps the calibration digital terrain model database (124) and the calibration digital terrain model database (124) is computed separately for each land-use type to find the error correction function for land-use. The land-use types are obtained from the land-use database (122) (such as EOSD). The information helps to identify forested areas versus non-forest areas. For example, the error would typically be greater for coniferous forests than for shrubs. The average value per land-use type is used thereafter to enhance the DTM.

Operational control is transferred from the third program (204) of FIG. 2A-1 to operation (502).

Operation (502) includes reading (retrieving) the data stored in the calibration digital terrain model database (124). The data stored in the calibration digital terrain model database (124) includes the calibration digital terrain model (such as, and not limited to, the representative LiDAR strips data and/or any equivalent thereof). Operation (502) further includes a processing operation, such as re-interpolating the data retrieved from the calibration digital terrain model database (124) to a relatively different size (such as, five meters). The data computed by operation (502) is provided for operation (512). Control is passed to operation (504).

Operation (504) includes reading (retrieving) the data stored in the digital terrain model database (116). The data stored in the digital terrain model database (116) represents the satellite DTM data. Operation (504) further includes a processing operation, such as re-interpolating the digital terrain model database (116) to a relatively different size (such as, five meters). The data computed by operation (504) is provided for operation (512). Control is passed to operation (506).

Operation (506) includes reading (retrieving) the data stored in the digital surface model database (125). The data stored in the digital surface model database (125) represents the digital surface model data. The data retrieved by operation (506) is provided for operation (508). Control is passed to operation (508).

Operation (508) includes a processing operation, such as applying a low pass filter to smooth the three dimensional edges for the data provided by operation (506). The data computed by operation (508) is provided for operation (510). Control is passed to operation (510).

Operation (510) includes a processing operation, such as calculating the curvature of the digital surface model database (125) data provide by operation (508). The calculated curvature of the DSM data (the data computed by operation (510) are provided for operation (514). Control is passed to operation (512).

Operation (512) includes a processing operation such as calculating the elevation error (for the data provided by operation (502) and the data provided by operation (504)). For ease of communication, the terrain curvature elevation error is called the elevation error [E1]. More specifically, operation (512) includes calculating the elevation error as, for example, digital terrain model database (116) data minus calibration digital terrain model database (124); that is, the digital terrain model database (116) minus the calibration digital terrain model database (124) for the area matching the digital terrain model database (116) and the calibration digital terrain model database (124). The data computed by operation (512) is provided to operation (514). Control is passed to operation (514).

Operation (514) includes a processing operation, such as using appropriate statistical software, to calculate the terrain curvature elevation error correction function. Specifically, operation (514) includes calculating the terrain curvature elevation error correction function using regression between: (a) the elevation error [E1]; and; (b) the terrain curvature in medium areas with a high terrain curvature. Control is passed to operation (516).

Operation (516) includes a processing operation, such as applying the terrain curvature elevation error correction function to correct terrain curvature elevation error in the portion of digital terrain model database (116), contained in the calibration digital terrain model database (124). This generates the corrected DTM, and may be called the cDTM.

Specifically, operation (516) includes correcting the DTM (cDTM) using the terrain curvature error correction function on the area corresponding to the calibration digital terrain model database (124). Operational control is passed to operation (518).

Operation (518) includes a processing operation, such as calculating the (InSAR) DTM elevation error caused by land-use, which for ease of communication we will call here [E2], by subtracting elevations of the cDTM from elevations of the re-interpolated instance of the calibration digital terrain model database (124); that is, cDTM minus the calibration digital terrain model database (124) of FIG. 1. Operational control is passed to operation (520).

Operation (519) includes a processing operation; such as reading (retrieving) the data from the land-use database (122). The data from the land-use database (122) includes the land-use data. Operation (519) further includes a processing operation, such as reclassifying land sections with land-use data into classifications (forested class, water class, bare earth class; etc.) found in the data retrieved from the land-use database (122). Since the land-use data is already classified into various classes, operation (519) is executed. Operation (519) includes reclassifying the land-use data into classes that are of interest, such as forest land-use and/or non-forest land-use. The data computed by operation (519) is provided to operation (520). It will be appreciated that operation (519) for classifying general land-use classes is known to persons of skill in the art, and therefore is not further explained. Operational control is passed to operation (520).

Once the operation (519) is completed, operation (520) is executed. Operation (520) includes a processing operation, such as calculating the elevation correction function for land-use by calculating the mean elevation error [E2] for each land-use class. Operation (520) includes calculating the elevation error [E2] (also known as "bias") per land-use class, such as forested and non-forested land-use (the error correction function for land-use). Operational control is passed to operation (522).

Operation (522) includes writing (storing) the error correction functions computed from operation (514) and operation (520). Specifically, operation (522) includes storing the error correction function for terrain curvature and the error correction function for land-use to the error-correction database (524). Operational control is passed to forest-inventory management program (110) of FIG. 2A-1. The data stored in the error-correction database (524) represents the error correction function for terrain curvature and the error correction function for land-use.

FIG. 6 depicts the fourth program (206) of FIG. 2A-1, as a computer programming flowchart. The block diagram is for enhancing a satellite generated digital terrain model (enhancing the digital terrain model). The fourth program (206) is configured to enhance the DTM (enhancing a satellite generated digital terrain model). The fourth program (206) is configured to enhance the DTM data by adding other data, such as (and not limited to): (A) bare surfaces identified from the DSM (which have the same elevation as terrain); (B) optionally, spot elevations provided by topographic agencies; and/or, (C) the DTM with elevation errors corrected with the elevation error correction functions. The DTM is then re-interpolated to create relatively smaller pixels (for example, five meters).

Operational control is transferred from fourth program (206) of FIG. 2A-1 to operation (602).

Operation (602) includes reading (retrieving) data stored in the digital terrain model database (116) (also called the INPUT DATA 3). The data stored in the digital terrain model database (116) includes the digital terrain model (DTM) pixels for a large territory, which is to be inputted into the forest-inventory management program (110). Operation (602) further includes a processing operation, such as re-interpolating data retrieved from the digital terrain model database (116) to a relatively smaller resolution (such as, to five meters for example). The data contained or stored in the digital terrain model database (116) is provided for operation (608). Operational control is passed to operation (604).

Operation (604) includes reading (retrieving) the data stored in the digital surface model database (125) (also called the INPUT DATA 8). The data stored in the digital surface model database (125) includes digital surface model data for a large territory. Operation (604) further includes smoothing the three dimensional edges of the digital surface model database (125) by using a low pass filter. The digital surface model database (125) may be provided as a separate data product (to be sold as a vendible product) with the multispectral imagery mosaics. In this option of the forest-inventory management program (110), the DSM is provided as a separate product, and is not extracted (processed) by the forest-inventory management program (110). The data retrieved from the digital surface model database (125) is provided for operation (606). Operational control is passed to operation (606).

Operation (606) includes a processing operation, such as calculating the curvature from the DSM data provided by the operation (604). Operational control is passed to operation (608).

Operation (608) includes reading (retrieving) the data stored in the error-correction database (524). The data stored in the error-correction database (524) includes the error correction function data. Operation (608) further includes a processing operation, such as correcting the elevation error for terrain curvature in areas of medium-curvature areas to high-curvature areas, and in areas with high curvature by using the elevation error correction function for terrain curvature. In this manner, the data retrieved from the digital terrain model database (116) is corrected or adjusted for elevation error. The results of operation (608) are passed to (made available to) operation (612). Operational control is passed to operation (610).

Operation (610) includes reading (retrieving) the data stored in the land-use database (122) (also called INPUT DATA 6). The data stored in the land-use database (122) includes land-use data for the large territory. Operation (610) further includes a processing operation, such as reclassifying the land-use data into forested area, water area, bare earth area, etc. The results of operation (610) are passed to (made available to) operation (612). Operational control is passed to operation (612). The land-use data is already classified, and may have too many classifications for what may be required compared to the features of interest. Accordingly, reclassification of the data may be performed into the features that are of interest. For example there may be a need to distinguish between forested areas and non-forested areas.

Operation (612) includes reading (retrieving) the data stored in the error-correction database (524) (depicted in FIG. 5). Operation (612) further includes a processing operation, such as correcting the elevation errors (bias) in DTM by using the elevation error correction function for land-use, and land-use classifications, for example for forested versus non-forested land-uses. Operation (612) further includes correcting elevation error (bias) based on the land-use data by using the error correction function for land-use.

The data computed in operation (612) is to be passed (provide to) to operation (616). Operational control is passed to operation (616).

Operation (614) includes reading (retrieving) the data stored in the forest-feature output cell database (126). The data stored in the forest-feature output cell database (126) includes hardwood data, softwood data, and other data for the large territory. Operation (614) further includes a processing operation, such as finding (identifying) the feature cells classified as terrain or water, or bare surface, at their center points. Operation (614) further includes extracting the XYZ center points from the DSM. As described previously, there are many instances where the DTM equals the DSM. The forest-inventory management program (110) is configured to search for those cells classified as water surface or as terrain surface (or bare surface). The forest-inventory management program (110) is configured to retrieve the XYZ points of the centers of these cells. The XYZ points can be expressed as, for example, latitude (Y), longitude (X) and (Z) elevation above sea level. The data computed as a result of operation (614) is to be provided to operation (616). Operational control is passed to operation (616) or to (618).

Operation (616) includes reading (retrieving) the data stored in the spot-elevation database (112). The data stored in the spot-elevation database (112) includes spot elevations for the large territory. Operation (616) further includes a processing operation, such as merging the data from the spot elevations (the data retrieved from the spot-elevation database (112), the data from the bare surfaces (the data provided by the operation (610)), and the data from the corrected DTM (corrected for terrain curvature and land-use) (the data provided by the operation (612)) into the DTM being constructed. Operation (616) further includes merging corrected DTM, the bare surfaces and the spot elevations into an enhanced DTM being constructed. It will be appreciated that the use of the data from the spot-elevation database (112) is optional. Operational control is passed to operation (618).

Operation (618) includes a processing operation, such as making use of the data incorporated for the DTM data (the data computed in operations (616) and/or (614)). Operation (618) includes interpolating the cDTM points to create enhanced DTM pixels (eDTM) over the large territory. The operation (616) is configured to use a spatial interpolation process to create new enhanced and higher resolution pixels of terrain. It may be appreciated that the spatial interpolation process does not have to be a straight-line interpolation. The forest-inventory management program (110) is configured to interpolate the merged data to create enhanced DTM pixels over the large territory. Operational control is passed to operation (620).

Operation (620) includes a processing operation, such as using the data contained in the enhanced DTM to determine the XYZ points of the center of each enhanced pixel. Operation (620) is configured to find the XYZ points of centers of the eDTM pixels. The XYZ points can be expressed as, for example, latitude (Y), longitude (X) and (Z) elevation above sea level. Operational control is passed to operation (622).

Operation (622) includes writing (storing) the enhanced DTM pixels (enhanced pixels) to the enhanced digital terrain model database (133). Operational control is passed to forest-inventory management program (110) of FIG. 2A-1.

FIG. 7 depicts the fifth program (208) of FIG. 2A-1, as a computer programming flowchart. FIG. 7 depicts a block diagram for producing a canopy height model over a large territory. The fifth program (208) is configured to produce the canopy height data and maps, specifically to output or to write the dominant height canopy-height model output-cell attribute database (128).

Operational control is transferred from the fifth program (208) of FIG. 2A-1 to operation (702).

Operation (702) includes reading (retrieving) the digital surface model database (125). The operation (702) further includes retrieving the digital surface model from the digital surface model database (125). Operational control is passed to operation (704).

Operation (704) includes reading the enhanced digital terrain model database (133) (also called the Output Data 5 and depicted in FIG. 6). The data received from the enhanced digital terrain model database (133) includes the digital terrain model (eDTM) data (eDTM pixels) produced in FIG. 3 from storage media. Operational control is passed to operation (706).

Operation (706) includes a processing operation, including calculating (computing) the canopy height model (CHM) data (that is, computing the CHM pixels). For each pixel (for example, five meter×five meter sized pixel), the operation (706) is configured to calculate the following parameter:

$$CHM = DSM - eDTM.$$

Once computed, operational control is passed to operation (708). CHM stands for "Canopy Height Model". If the pixels contained in the digital surface model database (125) and the enhanced Digital Terrain Model pixels contained in the enhanced digital terrain model database (133) are each, for example, five meter pixels, the canopy height model pixel database (127) will be a digital file with five meter pixels representing the canopy heights in the forest. A canopy height model is created because this contains very valuable information on tree heights (being information that the Ontario Forest Research Institute has said cannot be obtained—see document, referenced above at paragraph [00010]).

Operation (708) includes a processing operation, such as stratifying the feature cells into height and species strata by using the information on canopy height and feature cell class into height classes (for example, height classes: short class, tall class, medium class, etc.) and species strata (for example, species classes: hardwood class, mixed class, softwood class, etc.). In this example, the strata has six strata classes (two height classes×three species classes). Operation (708) is configured to stratify output cells into height and species strata (for example, hardwood strata, softwood strata, mixed strata, short strata, medium strata, tall strata). Operational control is passed to operation (710).

Operation (710) includes writing (storing) data to the canopy height model pixel database (127), in which the data includes the canopy height model data. Operational control is passed to forest-inventory management program (110) of FIG. 2A-1.

FIG. 8 depicts the sixth program (210) of FIG. 2A-1, as a computer programming flowchart. FIG. 8 depicts a block diagram for calibrating parameters for calculating (estimating) the forest attributes from aggregated pixels across a large territory. The sixth program (210) is configured to calibrate the forest attribute parameters.

Operational control is transferred from the sixth program (210) of FIG. 2A-1 to operation (802).

Operation (802) includes reading the field-plot database (118) in which the data includes the field-plot data. Operation (802) further includes reading the canopy height model pixel database (127) that includes the canopy-height model pixel data. Operation (802) further includes a processing operation, such as cutting windows from the CHM pixels in the imagery to match with the corresponding field plot data. The CHM is the canopy height model. Operation (802) further includes selecting pixels that match field plot locations. Operational control is passed to operation (804).

Operation (804) includes a processing operation, such as retrieving statistics from location in the CHM data from the canopy height model pixel database (127) that match plot locations. Statistics may include standard deviation, mean, coefficient of variation, range (max-min), xth percentile, etc. For example, if the CHM is in five meter×five meter pixels, and the plot size is 20 meter×20 meter pixels, there will be 16 CHM pixels in the plot (20/5=4, and 4×4=16). From these, the various statistics of the 16 CHM pixels may be calculated. For each feature cell corresponding to a sample plot "i", some statistics may be calculated that may be called [Yi]. The [Yi] may be, for example: (A) the mean height from the 16 CHM pixels that corresponds to the plot; or, (B) the "p"th percentile ("p"th may be 10th, 50th, 90th percentile) of the heights of the 16 CHM pixels (if there are [N] sample plots, then [i]=1, . . . , N).

Operation (806) further includes finding coefficients for the equations to compute (predict) the dominant tree (canopy) height from the statistics [Yi] derived from the CHM for each stratum. The coefficients are for linear regression equations of the form:

[Yi]=f[Xi]. It will be appreciated that in this instance [Yi] and [Xi] represent something different than in an earlier instance in which they were about error correction functions.

The [Xi] are some statistical function of the data from plot [i], for example, the average height of the trees in the dominant stratum. The [Yi] are some statistic (e.g. 90th percentile height) from the CHM pixels that covers the area of plot [i].

Operation (808) includes a processing operation, such as transforming the CHM into dominant height CHM (dCHM) through calibration with field plots in the location of the fieldplots. The CHM tends to have a negative bias because of the way the DSM is produced. In forests where the dominant height canopy is "spiky", which is common in the boreal forest, the DSM tends to under-estimate the canopy height. In this step, the CHM is compared to the height of the dominant trees in the field plots. Correction factors are found to increase or decrease the CHM model to produce the dCHM. Operation (808) may be performed by the auxiliary program (111) of FIG. 1 (provided by a software vendor), if so desired. Operational control is passed to operation (810).

Operation (810) includes reading (retrieving) the forest-feature output cell database (126) in which the data includes features such as hardwood, softwood, and other features. Operation (810) may be performed by the auxiliary program (111) of FIG. 1 (provided by a software vendor), if so desired. Operation (810) further includes a processing operation such as locating (finding) the statistics for a particular territory to predict the attributes of that territory for each stratum (as shown in FIG. 2B). Specifically, operation (810) includes finding statistics for predicting forest attributes (for example, absolute basal area (as opposed to percent softwood basal area) and timber volume) for each stratum using species class map and dCHM. This operation may include a regression of the statistics obtained in operation (806) on the data from the plots, so that a prediction may be made of the attributes from the statistics across the large territory by stratum. Regression can be one of many types: non-linear, linear, stepwise, general linear model, etc. This step involves a human doing the regressions to calibrate the coefficients for a new large territory, but not for producing attribute data within a large territory. Sample plots for each large territory are needed. Regressions are done for the form [Yi]=f[Xi] with different [Yi] (timber volume or dominant canopy height) but the same possible statistical functions for the [Xi] (mean, pth percentile, etc.). Operational control is passed to operation (812).

Operation (812) includes writing (storing) the output result data to the strata database (814). The strata database (814) contains (includes) the set of selected estimation statistics, and the coefficients to be applied to the estimation equation for each stratum (for a large territory, as shown in FIG. 2B). Operation (812) includes writing (providing, output) the statistics and coefficients for calculating output cells with forest attributes (for example, timber volume and dominant canopy height and absolute basal area) for each stratum for the large territory to the strata database (814). Operational control is passed to forest-inventory management program (110) of FIG. 2A-1.

It will be appreciated that the information on the strata (that is, the rows and columns of the matrix depicted in FIG. 2B) is passed on to the sixth program (210). For example, a text file is generated and stored, and then the sixth program (210) then reads the information on the strata.

Figure 9:
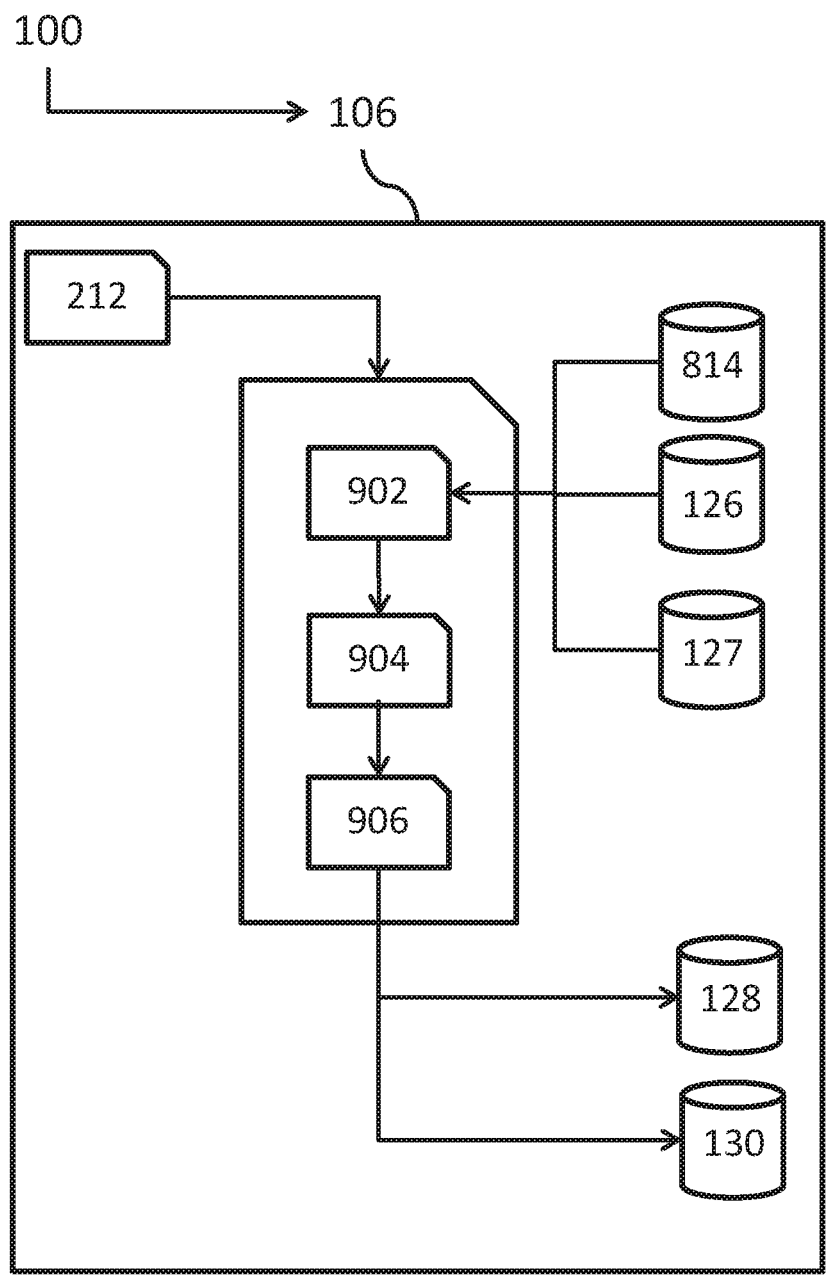
FIG. 9 (SHEET 17 OF 21 SHEETS) depicts a seventh program of the processor-executable programmed code of FIG. 2A-1, in accordance with an embodiment of the present invention.

FIG. 9 depicts the seventh program (212) of FIG. 2A-1, as a computer programming flowchart. FIG. 9 depicts a block diagram for estimating the forest attributes from aggregated pixels across a large territory. The seventh program (212) is configured to produce the forest attribute data and maps.

Operational control is transferred from the seventh program (212) of FIG. 2A-1 to operation (902).

Operation (902) includes retrieving (reading) the parameters for calculating attribute cells with the forest attributes (for example, timber volume, dominant canopy height, and absolute basal area) for each stratum of the forest for the large territory. Specifically, operation (902) further includes reading the data from the strata database (814) of FIG. 8. Operation (902) further includes reading the forest-feature output cell database (126) in which the data includes the hardwood, softwood, and other classified features. Operation (902) further includes reading the canopy height model pixel database (127) in which the data includes the canopy height data. Operational control is passed to operation (904).

Operation (904) includes a processing operation such as calculating (estimating) the forest attributes for all attribute cells for the large territory by using the parameters and the inverse of the equations described in operation (708) of FIG. 7. Specifically, operation (904) includes calculating (estimating) the output cells with forest attributes (for example, timber volume, and dominant canopy height and absolute basal area) for each stratum for the large territory. Operation 904 is configured to compute a dominant height canopy height-attribute cell. Operational control is passed to operation (906).

Operation (906) includes writing the forest output-cell attribute database (130) in which the data includes the attributes cells over the large territory. The output-cell attribute database may contain timber volume and absolute basal area for each stratum for the large territory. Operation (906) includes writing the dominant height canopy-height model output-cell attribute database (128), which contains the dominant canopy height for each stratum for the large territory. Operational control is passed to forest-inventory management program (110) of FIG. 2A-1.

FIGS. 10A, 10B, 10C and 10D (SHEETS 18 to 21 of 21 SHEETS) depict a comparison of outputs of the processor-executable programmed code of FIG. 2A-1, in accordance with an embodiment.

Figure 10A:
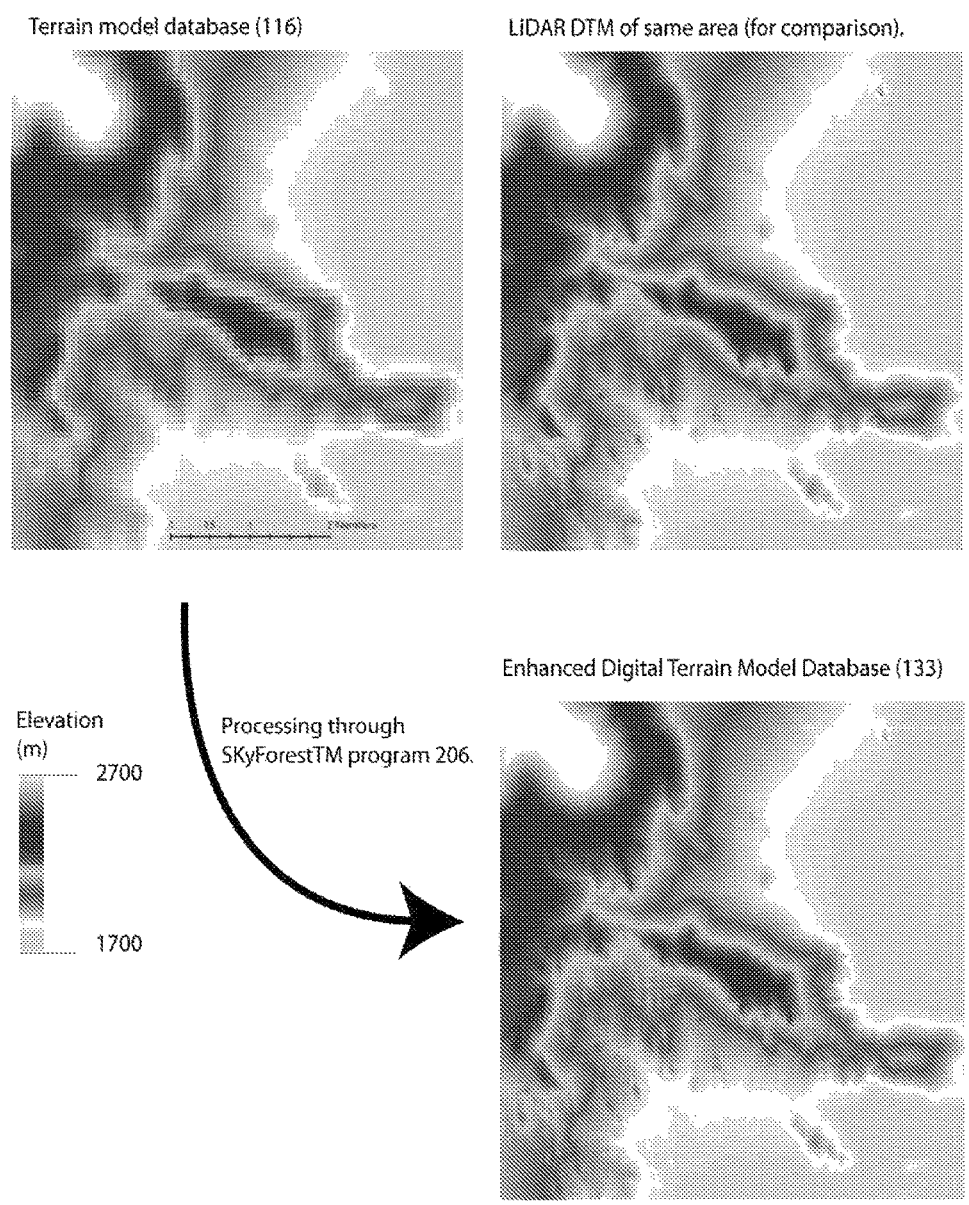
FIGS. 10A, 10B, 10C and 10D (SHEETS 18 to 21 of 21 SHEETS) depict a comparison of outputs of the processor-executable programmed code of FIG. 2A-1, in accordance with an embodiment of the present invention.

FIG. 10A depicts a comparison of the enhanced digital terrain model database (133) with the same geographic area represented by LiDAR data. The digital terrain model database (116) depicted in FIG. 1 is converted to the enhanced digital terrain model database (133) by the fourth program (206) depicted in FIG. 6. The enhanced digital terrain model database (133) is shown directly below a LiDAR digital terrain model from the same area. The two match closely (to a reasonable degree).

Figure 10B:
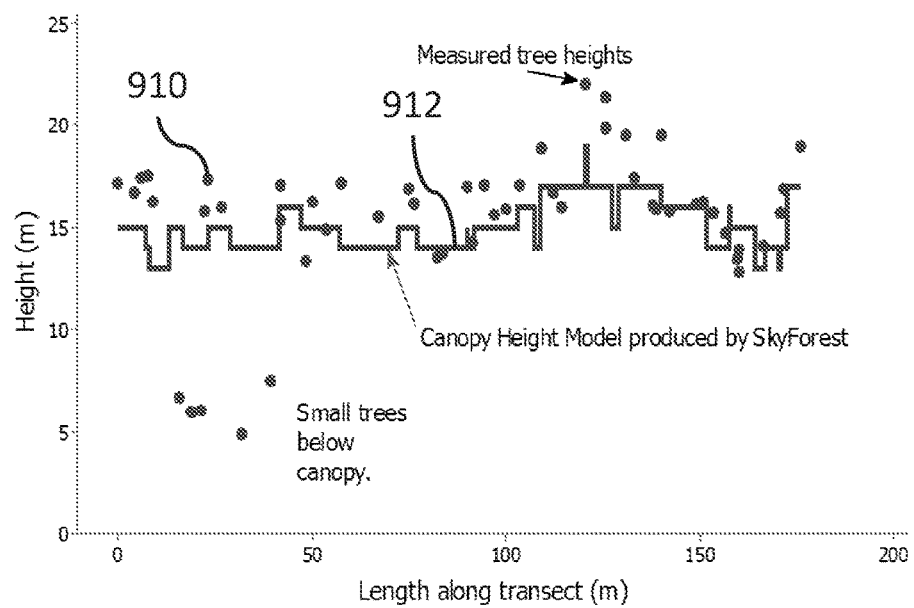

FIG. 10B depicts a comparison of the canopy height model (CHM) produced by operation (706), depicted in FIG. 7, with the actual measured heights of trees. The trees were measured along a transect. Their height was measured to within ±0.1 meter (m) accuracy and their geolocation was measured to within ±1 meter accuracy. The blue dots (910) represent the heights of the trees (the Y axis) and their position along the transect (the X axis). The red line (912) indicates the CHM from operation (706). Some small trees along the transect were measured, however these were below the canopy and did not influence the position of the CHM. The CHM was produced in five meter pixels. It will be appreciated that the transect was not in a perfectly straight line and the trees did not fall on a perfectly straight line. The transect thus cuts the pixels at various angles, creating a variety of line segment lengths of the red line (912) representing the CHM.

Figure 10C:
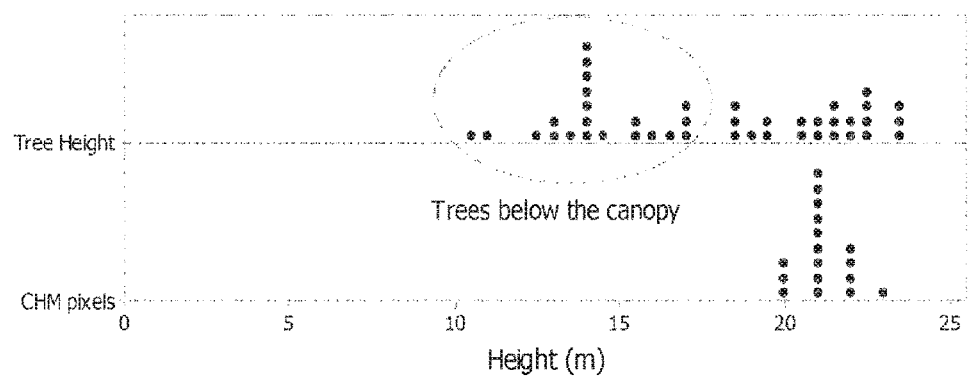
Figure 10D:
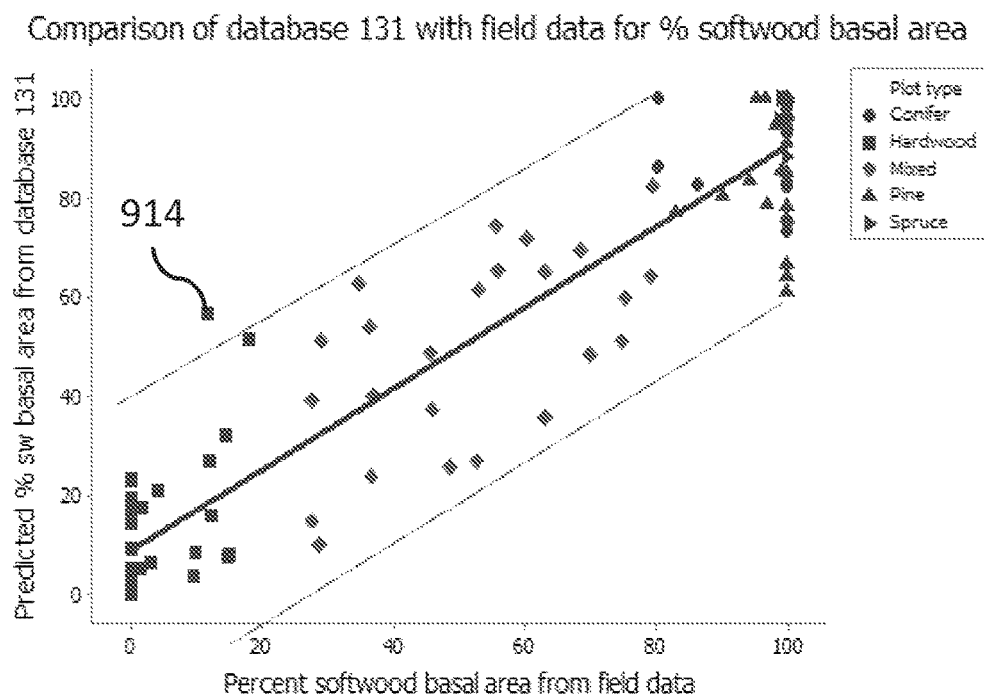

FIG. 10C depicts another comparison of the canopy height model (CHM) produced by operation (706), depicted in FIG. 7, with the actual measured heights of trees from a single sample plot taken from the field-plot database (118). The tree heights were measured within a sample plot of 11.3 meter radius. The height of all CHM pixels that fall at least 50 percent (%) within the sample plot are also shown. The heights of the trees in the dominant canopy are on the right hand side of the tree height dot plot. As can be seen they closely match (with an acceptable degree of tolerance) the height of the CHM pixels that are plotted directly underneath. Other trees are below the canopy. These CHM pixels are indicated by an oval surrounding the corresponding dots. As these CHM pixels are located below the canopy, these CHM pixels are not detected by operation (706), and thus there are no corresponding dots in the CHM pixels.

FIG. 10D depicts a comparison of the percent softwood basal area database (131) with actual percent softwood basal area with matching plots from the field-plot database (118). The dominant species from each plot are indicated by colour symbols. As can be seen, hardwood plots (914) (indicated in a red colour) have low softwood basal area and are seen in the lower left hand side of FIG. 10D. Softwood plots have high softwood basal area and are seen in the upper right hand side of FIG. 10D. The softwood plots include plots that are predominantly pine, spruce, or other conifer trees (such as fir, cedar or larch). The mixed plots in FIG. 10D are those that have a mixture of hardwood and softwood and whose percent softwood basal area is between 20% and 40%. FIG. 10D indicates that the second program (202), depicted in FIG. 2A-3 and FIG. 4) produces values of percent softwood basal area in the percent softwood basal area database (131) that closely correspond to the field data. It will be appreciated that persons skilled in the art know how to classify hardwood and softwood, and since this method has so much error associated with it, this method is not often used commercially (for that reason). An aspect of the embodiment adds a unique operation, which is a computation for computing (calculating) percent softwood basal area, and use the computational result to classify hardwood, softwood and mixed wood. As shown in FIG. 10D, the relationship between (A) the percent softwood basal area (stored in the percent softwood basal area database (1 and (B) the percent softwood basal area in the field plots (stored in the field-plot database (118)) is very strong. Thus, the percentage softwood basal area may be used to more accurately classify hardwood, softwood and mixed wood, and this is shown in FIG. 10D.

Server System

According to one option, the server system (102) includes controller-executable instructions configured to operate the server system (102) in accordance with the description provided above. The server system (102) may use computer software, or just software, which is a collection of computer programs (controller-executable instructions) and related data that provide the instructions for instructing the server system (102) what to do and how to do it. In other words, software is a conceptual entity that is a set of computer programs, procedures, and associated documentation concerned with the operation of the server system (102), also called a data-processing system. Software refers to one or more computer programs and data held in a storage assembly (a memory module) of the controller assembly for some purposes. In other words, software is a set of programs, procedures, algorithms and its documentation. According to another option, the server system (102) includes application-specific integrated circuits configured to operate the server system (102) in accordance with the description provided above. It may be appreciated that an alternative to using software (controller-executable instructions) in the server system (102) is to use an application-specific integrated circuit.

The server system (102) may be a physical computer (a computer hardware system) dedicated to run one or more services (as a host), to serve the needs of the users of other computers on a network. The server system (102) may also be a virtual machine (VM). The virtual machine is a simulation of a computer system (abstract or real) that is usually different from the target computer system (where it is being simulated on). Virtual machines may be based on the specifications of a hypothetical computer or emulate the architecture and functioning of a real-world computer. The virtual machine is a software implementation of the physical computer system that executes programs like a physical machine. Virtual machines are separated into two major categories, based on their use and degree of correspondence to any real machine. A system virtual machine provides a complete system platform, which supports the execution of a complete operating system (OS). These usually emulate an existing architecture, and are built with either the purpose of providing a platform to run programs where the real hardware is not available for use (for example, executing software on otherwise obsolete platforms), or of having multiple instances of virtual machines lead to more efficient use of computing resources, both in terms of energy consumption and cost effectiveness (known as hardware virtualization, the key to a cloud computing environment), or both. In contrast, a process virtual machine (also, language virtual machine) is designed to run a single program, which means that it supports a single process. Such virtual machines are usually closely suited to one or more programming languages and built with the purpose of providing program portability and flexibility (amongst other things). An essential characteristic of a virtual machine is that the software running inside is limited to the resources and abstractions provided by the virtual machine—it cannot break out of its virtual environment. Depending on the computing service that the server system (102) offers, the server system (102) may be a database server, a file server, a mail server, a print server, a web server, a gaming server, or some other kind of server. In the context of client-server architecture, the server system (102) is a computer program running to serve the requests of other programs, the clients. Thus, the server system (102) performs some computational task on behalf of clients. The clients either run on the same computer or connect through the network. In the context of Internet Protocol (IP) networking, the server system (102) is a program that operates as a socket listener. Servers often provide essential services across a network, either to private users inside a large organization or to public users via the Internet.

It may be appreciated that the assemblies and modules described above may be connected with each other as may be needed to perform desired functions and tasks that are within the scope of persons of skill in the art to make such combinations and permutations without having to describe each and every one of them in explicit terms. There is no particular assembly, or components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments; (iii) the summary; (iv) the abstract; and/or, (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

The invention claimed is:

1. A system for creating an enhanced digital terrain model having enhanced resolution and accuracy for a target portion of the surface of the Earth, the target portion being subdivided into sub-portions of a first size, and being further subdivided into sub-portions of a second size, the second size being smaller than the first size, the system comprising:
   a. an electronic interface for receiving, and a non-transitory memory for storing:
      i. a base digital terrain model specifying an elevation for each first size sub-portion, the base digital terrain model being based on interferometric synthetic aperture radar data;
      ii. a calibration digital terrain model corresponding to a reference portion of the target portion specifying a reference elevation for each second size sub-portion;
   b. a computer processor configured to:
      i. for the reference portion, calculate errors in the digital terrain model by comparing the elevations in the digital terrain model with the reference elevations in the calibration digital terrain model for the reference portion;
      ii. obtain stereo imagery from an airborne or spaceborne imaging sensor of the target portion, the imagery being sufficient to permit the calculation of a surface elevation of each second size sub-portion;
      iii. calculate a digital surface model by stereophotogrammetric analysis of the imagery, the digital surface model specifying a surface elevation for each second size sub-portion;
      iv. calculate for each second size sub-portion, from the digital surface model, a terrain curvature value based on the digital surface model;
      v. calculate a terrain curvature error correction function by comparing the errors in the digital terrain model with the terrain curvature values for the reference portion, the terrain curvature error correction function estimating the error in the digital terrain model elevations as a function of terrain curvature value;
      vi. calculate, for each second size sub-portion, a corrected elevation by applying the terrain curvature error correction function to the elevation of the corresponding first size sub-portion in the digital terrain model based on the terrain curvature value of the second size sub-portion to produce the corrected elevation for the second size sub-portion in the enhanced digital terrain model; and
      vii. produce a digital image of the target portion, the digital image comprising pixels, each pixel having a pixel size of at most the second size, each pixel corresponding to one second size sub-portion of the target portion, each pixel having a value calculated based on the corrected elevation specified in the enhanced digital terrain model for the second size sub-portion corresponding to the pixel, wherein the value is calculated in a manner to distinguish sub-portions of the target area at differing elevations from each other.

2. The system of claim 1, wherein the computer processor is further configured to calculate and apply a land-use error correction function based on land-use, and to apply the land-use error correction function to the elevations in the base digital terrain model prior to calculating the corrected elevations.

3. The system of claim 1, wherein the terrain curvature error correction function is calculated by regressing the errors in the digital terrain model against the terrain curvature values for the reference portion.

4. The system of claim 1, wherein the digital surface model is calculated by first calculating a high-resolution digital surface model specifying elevations for sub-portions having a size smaller than the second size, and then smoothing the high-resolution digital surface model using a filter.

5. The system of claim 1, wherein the computer processor is further configured to calculate a canopy height model for the target portion of the surface of the Earth, the canopy height model specifying a height for each of a plurality of sub-portions of the target portion, the height being calculated based on the difference between elevations for corresponding sub-portions specified in the digital surface model and the enhanced digital terrain model.

6. The system of claim 1, wherein the calibration digital terrain model is produced via LIDAR scanning of the reference portion.

7. The system of claim 1, wherein the reference portion is selected to comprise bare ground, and the calibration digital terrain model is produced by photogrammetric analysis of imagery of the reference portion.

8. A method of creating an enhanced digital terrain model having enhanced resolution and accuracy for a target portion of the surface of the Earth, the target portion being subdivided into sub-portions of a first size, and being further subdivided into sub-portions of a second size, the second size being smaller than the first size, the method comprising the steps of:
   a. providing a base digital terrain model specifying an elevation for each first size sub-portion, the base digital terrain model being based on interferometric synthetic aperture radar data;
   b. providing a calibration digital terrain model corresponding to a reference portion of the target portion specifying a reference elevation for each second size sub-portion;
   c. for the reference portion, calculating errors in the digital terrain model by comparing the elevations in the digital terrain model with the reference elevations in the calibration digital terrain model for the reference portion;
   d. obtaining stereo imagery from an airborne or spaceborne imaging sensor of the target portion, the imagery being sufficient to permit the calculation of a surface elevation of each second size sub-portion;
   e. calculating, by a computer processor, a digital surface model by stereophotogrammetric analysis of the imagery, the digital surface model specifying a surface elevation for each second size sub-portion;
   f. calculating for each second size sub-portion, from the digital surface model, a terrain curvature value based on the digital surface model;
   g. calculating a terrain curvature error correction function by comparing the errors in the digital terrain model with the terrain curvature values for the reference portion, the terrain curvature error correction function estimating the error in the digital terrain model elevations as a function of terrain curvature value; and
   h. calculating, for each second size sub-portion, a corrected elevation by applying the terrain curvature error correction function to the elevation of the corresponding first size sub-portion in the digital terrain model based on the terrain curvature value of the second size sub-portion to produce the corrected elevation for the second size sub-portion in the enhanced digital terrain model.

9. The method of claim 8, further including a step of calculating and applying a land-use error correction function based on land-use, and applying the land-use error correction function to the elevations in the base digital terrain model prior to calculating the corrected elevations.

10. The method of claim 8, wherein the step of obtaining imagery comprises flying an airborne vehicle containing the imaging sensor over or sufficiently close to the target area.

11. The method of claim 8, wherein the terrain curvature error correction function is calculated by regressing the errors in the digital terrain model against the terrain curvature values for the reference portion.

12. The method of claim 8, wherein the digital surface model is calculated by first calculating a high-resolution digital surface model specifying elevations for sub-portions having a size smaller than the second size, and then smoothing the high-resolution digital surface model using a filter.

13. The method of claim 12, wherein the filter is a moving average filter.

14. The method of claim 8, further comprising the step of calculating a canopy height model for the target portion of the surface of the Earth, the canopy height model specifying a height for each of a plurality of sub-portions of the target portion, the height being calculated based on the difference between elevations for corresponding sub-portions specified in the digital surface model and the enhanced digital terrain model.

15. The method of claim 14 further comprising the step of producing a digital image of the target portion, wherein the digital image comprises pixels, each pixel corresponding to a particular sub-portion of the target portion, each pixel having a value calculated based on a height specified in the canopy height model for a sub-portion corresponding to the pixel.

16. The method of claim 15, wherein the pixel values are calculated in a manner to distinguish sub-portions of the target area having differing canopy heights.

17. The method of claim 8, wherein the calibration digital terrain model is produced via LIDAR scanning of the reference portion.

18. The method of claim 8, wherein the reference portion is selected to comprise bare ground, and the calibration digital terrain model is produced by photogrammetric analysis of imagery of the reference portion.

19. The method of claim 8 further comprising the step of producing a digital image of the target portion, the digital image comprising pixels, each pixel having a pixel size of at most the second size, each pixel corresponding to one second size sub-portion of the target portion, each pixel having a value calculated based on the corrected elevation specified in the enhanced digital terrain model for the second size sub-portion corresponding to the pixel, wherein the value is calculated in a manner to distinguish sub-portions of the target area at differing elevations from each other.

20. The method of claim 19, wherein the image pixel values are proportional to the corrected elevation specified in the enhanced digital terrain model for the second size sub-portion corresponding to the pixel.

* * * * *